United States Patent
Hammer

(10) Patent No.: US 12,064,303 B2
(45) Date of Patent: Aug. 20, 2024

(54) REMOVABLE PARTIAL DENTURE

(71) Applicant: exocad GmbH, Darmstadt (DE)

(72) Inventor: Vincent Michael Hammer, Georgia, VT (US)

(73) Assignee: EXOCAD GMBH, Darmstadt (DE)

( * ) Notice: Subject to any disclaimer, the term of this patent is extended or adjusted under 35 U.S.C. 154(b) by 0 days.

(21) Appl. No.: 17/206,457

(22) Filed: Mar. 19, 2021

(65) Prior Publication Data

US 2021/0298881 A1    Sep. 30, 2021

Related U.S. Application Data

(60) Provisional application No. 63/000,092, filed on Mar. 26, 2020.

(51) Int. Cl.
*A61C 13/00* (2006.01)
*A61C 13/01* (2006.01)
*A61C 13/093* (2006.01)

(52) U.S. Cl.
CPC ...... *A61C 13/1006* (2013.01); *A61C 13/0004* (2013.01); *A61C 13/01* (2013.01)

(58) Field of Classification Search
CPC . A61C 13/1006; A61C 13/0004; A61C 13/01; A61C 13/00; A61C 13/08; A61C 13/0006; A61C 13/1009; A61C 13/102
USPC ........................................................ 433/195
See application file for complete search history.

(56) References Cited

U.S. PATENT DOCUMENTS

| | | | |
|---|---|---|---|
| 6,267,596 B1 * | 7/2001 | Kalfas | A61C 13/01 433/178 |
| 2004/0219490 A1 | 11/2004 | Gartner et al. | |
| 2010/0086899 A1 | 4/2010 | Holzner et al. | |
| 2012/0107771 A1 * | 5/2012 | Hrenak | A61C 13/267 433/171 |
| 2016/0296305 A1 | 10/2016 | Förtsch et al. | |
| 2016/0317261 A1 | 11/2016 | Schnitzspan et al. | |

(Continued)

FOREIGN PATENT DOCUMENTS

| CN | 105960218 A | * 9/2016 | ............. A61C 13/08 |
|---|---|---|---|
| JP | 2016-021993 A | 2/2016 | |
| JP | 2019-507635 A | 3/2019 | |

OTHER PUBLICATIONS

Japanese Office Action, dated Oct. 10, 2023, issued in Japanese Patent Application No. 2022-558318.

*Primary Examiner* — Yogesh P Patel
(74) *Attorney, Agent, or Firm* — Harness, Dickey & Pierce, P.L.C.

(57) ABSTRACT

The invention relates to an assembly set for a removable partial denture comprising one or more replacement teeth as well as a framework with one or more retention sections. Each of the retention sections is configured to receive and retain one or more of the replacement teeth. Each of the replacement teeth comprises a bottom face with a surface structure configured to engage an assigned complementary retention structure provided by one of the retention sections of the framework configured to receive the respective replacement tooth. Each surface structure provides in combination with the assigned complementary retention structure a non-destructive detachable direct connection between the replacement tooth comprising the respective surface structure and the retention section comprising the respective assigned complementary retention structure.

17 Claims, 14 Drawing Sheets

(56) References Cited

U.S. PATENT DOCUMENTS

Figure 1:
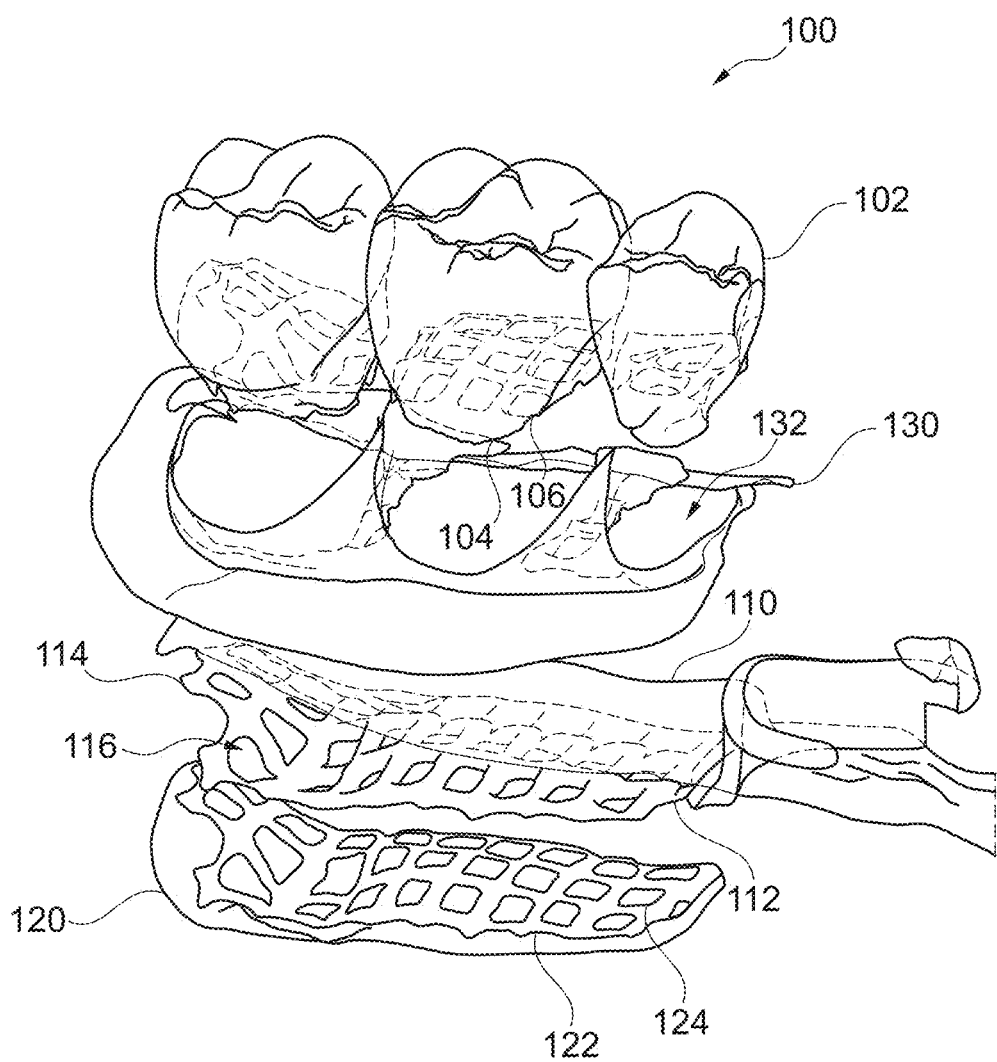

2017/0367798 A1\* 12/2017 Sagolla .............. A61C 13/0006
2018/0147036 A1 5/2018 Boehm \* cited by examiner

REMOVABLE PARTIAL DENTURE

The present application hereby claims priority under 35 U.S.C. § 119(e) to U.S. provisional patent application No. 63/000,092 filed Mar. 26, 2020, the entire contents of which are hereby incorporated herein by reference.

The invention relates to an assembly set for a removable partial denture, a removable partial denture, a computer system for constructing such an assembly set, a computer program product for constructing such an assembly set as well as a method for constructing such an assembly set and a method for assembling such an assembly set.

Removable partial dentures are dentures configured to be placed into and removed from the mouth. They are intended to replace missing teeth for functional and/or aesthetic reasons. Such partial dentures usually comprise one or more replacement teeth attached to a base providing an artificial gingiva for the replacement teeth. The artificial gingiva may be shaped and colored to mimic the patient's natural gingiva. The removable partial denture is intended to be placed into and removed from the mouth, to fit the patient's natural geometry in the mouth and to provide sufficient stability to ensure its structural integrity, when being used, e.g., for chewing.

It is an objective to provide for an improved removable partial denture as well as to provide for a computer system, a computer program product and a method for constructing such an improved removable partial denture.

In one aspect, the invention relates to an assembly set for a removable partial denture for a patient. The assembly set comprises one or more replacement teeth as well as a framework with one or more retention sections. Each of the retention sections is configured to receive and retain one or more of the replacement teeth. Each of the replacement teeth comprises a bottom face with a first surface structure configured to engage an assigned complementary first retention structure provided by one of the retention sections of the framework configured to receive the respective replacement tooth. Each first surface structure in combination with the assigned complementary first retention structure provides a first non-destructive detachable direct connection between the replacement tooth comprising the respective surface structure and the retention section comprising the respective assigned complementary retention structure.

Embodiments may have the advantage, that the retention sections of the framework may receive replacement teeth and retain the replacement teeth via the respective non-destructive detachable direct connection. Thus, the replacement teeth may be attached to the framework, i.e., the retention sections of the framework, which supports the replacement teeth and hold them in a predefined position. The predefined position may be defined relative to the framework. In case one of the replacement teeth shows a defect or a short-coming, it may be detached from the framework and replaced by another replacement tooth. The retention sections may each provide a denture base.

The framework may provide stability to the removable partial dentures ensuring its structural integrity. The framework may thus provide a base for the partial denture. For this purpose, the framework may be made from a material providing sufficient stability for ensuring the structural integrity of the removable partial denture, e.g., when being placed in the patient mouth. The framework may for example be made from metal.

Besides receiving and retaining the replacement teeth, the framework may further be configured to provide support for the artificial gingiva parts. The framework may comprise retention sections configured to receive and retain artificial gingiva parts.

Furthermore, the framework may comprise one or more direct retainers for connecting the removable partial dentures to the patient's remaining denture, e.g., one or more remaining teeth, or an artificial abutment, e.g., an abutment attached to an implant. The direct retainers may for example comprise rests, clasps or telescopes. A telescopic fitting may, e.g., be configured to fit over an abutment attached to an implant. The framework may be configured to fit over a dental bar for support. The framework may further comprise one or more major connectors and/or one or more minor connectors. The framework may further comprise offsets, e.g., risers and reliefs. The different components of the framework, like offsets, e.g., risers and reliefs, connectors, e.g., major and minor connectors, and supporting components, e.g., guide planes, rests and clasps, may, e.g., be connected to the one or more retention sections of the framework configured to receive and retain the replacement teeth.

A major connector is an element of a removable partial denture providing a link between elements of the removable partial denture arranged on different sides of a patient's dental arch. Such a major connector may for example be provided in form of a lingual bar, a sublingual bar, a prelingual bar, a lingual plate, a buccal bar, a continuous clasp, a palatal plate, a palatal spoon plate, a palatal bar, or a u-shaped palatal bar. A minor connector is an element of a removable partial denture providing a link between the major connector or a denture base of the removable partial denture and other elements of the removable partial denture. A direct retainer or stabilizer is an element of the removable partial denture connecting the removable partial denture to an abutment tooth or other kind of abutment. It may retain and stabilize the removable partial denture in the mouth. A direct retainer or stabilizer may partially encompass or contact the abutment, e.g., abutment tooth. A denture base is an element of a removable partial denture providing a base for the replacement teeth.

A removable partial denture is a denture for a partially edentulous patient, providing one or more replacement teeth for replacing missing teeth. A removable partial denture may be used for functional and/or aesthetic reasons. Being removable refers to the fact that the patient may be able to remove and reinsert the removable partial denture without professional help.

Embodiments may have the advantage, that structural integrity of the removable partial denture is provided by the framework which may further provide a sufficient hold for the replacement teeth to retain them in an intended position. For example, additional artificial gingiva parts of the assembly set may neither be required to contribute to the structural integrity of the removable partial denture nor to the retention of the replacement teeth. Additional artificial gingiva parts may rather be configured to match a natural look, natural feeling and/or accurate fit in the patient's mouth. Therefore, more natural materials, e.g., softer and more flexible materials, may be used for the artificial gingiva parts.

Embodiments may have the advantage, that the surface structures and complementary retention structures may facilitate finding an exact position of accurate fit, in which the replacement teeth accurately fit onto the framework. In case the replacement teeth are arranged in through-holes provided by artificial gingiva parts, the surface structures and complementary retention structures may facilitate finding an exact position of the replacement teeth in the through-holes. The surface structures and complementary retention structures may provide a guidance to find the respective position of accurate fit. For example, the pairs of surface structures and complementary retention structures may each be configured to match only when being adjusted relative to each other in a predefined position relative to each other enabling a non-destructive detachable direct connection being established.

Embodiments may have the advantage, that an imperfection of the partial denture provided in form of an assembly set may easily be dealt with. Assuming such a partial denture shows deficits, such as an inaccurate match to the patient's jaw or an insufficient occlusion, e.g., when being provided to the patient at the dentist, such deficits may easily be corrected by replacing the parts showing deficits with deficiency-free replacement parts. In contrast, a partial denture provided as an end-product without non-destructive detachable connections allowing for a non-destructive replacement of inaccurate parts may provide only minor possibilities for further adjustments at most. This may for example be the case, if all the parts of the removable partial denture are already glued together generating connections not detachable without destruction. In such a case, it may be rather necessary to assume that the end-product, e.g., when being provided to the patient at the dentist, perfectly fits the patient without requiring further adjustments. If the fit turns out to be insufficient, the partial denture as a whole may have to be replaced by a new one. Providing a new partial denture may require to repeat the complete procedure of scanning the patient mouth as well as modelling and producing the partial denture once again. Embodiments may allow to avoid the aforementioned disadvantages and rather provide the possibility to assemble the partial denture provided in form of an assembly set using non-destructive detachable connections and to try its fit, before finally bonding the parts together using permanent connections, e.g., by using adhesives.

For example, the individual parts of the assembly set may be provided, assembled and tested. In case the tests are satisfying, the parts may be permanently connected, e.g., using an adhesive. Such an approach may have the advantage of allowing for a production and testing of the assembly set without requiring any physical reproduction of scan data of the patient's mouth, e.g., there is no need for a stone/gypsum model of the patient's jaw. Scan data of the patient's mouth may rather be provided to a computer system, providing a digital model of the patient's jaw or jaws. This digital model of the patient's jaw or jaws may be used for generating a digital model of the removable partial denture in form of an assembly set. The different parts of the digital model of the removable partial denture may all be produced using full automated processes, like e.g. 3D printing. The produced assembly set may then be assembled and tested in the patient's mouth directly without requiring artificial reproductions of the patient's jaw for the tests.

All parts of the assembly set may be connected together for the purpose of testing the assembled removable partial denture in the patient mouth without permanently connecting the parts, e.g., via gluing. If necessary, the partial denture may for example be adjusted by replacing one or more of the replacement teeth, e.g., in order to ensure a precise fit to the real patient occlusion situation. Thus, a replacement of parts of the partial denture may be enabled without requiring a replacement of the whole partial denture.

In accordance with an embodiment, one or more of the first surface structures each comprises one or more first protrusions protruding from the bottom face of the replacement tooth comprising the respective first surface structure. One or more of the first retention structures each comprises one or more first receptions for receiving the one or more first protrusions. Each of the first protrusions is arranged at a position aligned with a respective position of one of the first receptions configured to receive the respective first protrusion in order to establish the first non-destructive detachable direct connection.

Embodiments may have the advantage, that first non-destructive detachable direct connections between the replacement teeth and the framework may be established by inserting the first protrusions into the first receptions. The retention sections may receive the replacement teeth by receiving the first protrusions in the first receptions.

In accordance with an embodiment, each of the first protrusions comprises a circumferential shape matching a shape of the aligned first reception. The first protrusions may have a circular, elliptical, or polygonal, e.g., square or rectangular, cross section. The first receptions may have matching cross sections. In accordance with an embodiment, the protrusions may have the form of elongated ridges or rails and the receptions may have the form of matching slots or notches. According to embodiments, the first protrusions may have identical cross sections. According to embodiments, the cross sections of the first protrusions may vary in shape and/or size.

In accordance with an embodiment, one or more of the first receptions in form of a slot or notch may extend below a plurality of adjacent replacement teeth. The adjacent replacement teeth may be provided as a set of connected bridged replacement teeth with one or more of the first protrusions in form of matching elongated ridges or rails extending across the bottom faces of the adjacent replacement teeth. Embodiments may have the advantage that adjacent replacement teeth may be attached as a unit allowing for increasing strength and speed of assembly.

In accordance with an embodiment, the first receptions are provided in form of blind holes extending into the retention section. In accordance with an embodiment, the first receptions are provided in form of through-holes extending through the retention sections. In accordance with an embodiment the through-holes extending through the retention sections form mesh structures with each of the through-holes providing an individual mesh of the mesh structure.

In accordance with an embodiment, one or more of the aligned first receptions each are configured to provide, when the first non-destructive detachable direct connection is established, a remaining free space at a top of the aligned and received first protrusion for receiving an adhesive in order to provide an additional first permanent connection between the replacement teeth and the retention sections. Embodiments may have the advantage, that in addition to the non-destructive detachable direct connections permanent connections between the replacement teeth and the retention sections may be provided. By filling the free space at a top of the aligned and received first protrusions, the non-destructive detachable connection may be transformed into a permanent connection. The non-destructive detachable direct connections may be used to connect the replacement teeth to the framework for checking their proper fit. In case the check has been successful, the permanent connections may be established in order to strengthen the bonding.

In accordance with an embodiment, the bottom faces of the replacement teeth and/or the retention structures comprises a plurality of additional recesses for receiving an adhesive in order to provide the additional first permanent connection between the replacement teeth and the retention sections. Embodiments may have the advantage, that the adhesive may collect and harden in the recesses forming a stronger bond between the replacement teeth and the retention sections.

In accordance with an embodiment, one or more of the first retention structures each comprise one or more first protrusions protruding from the retention section comprising the respective first retention structure. One or more of the first surface structures each comprises one or more first receptions for receiving the one or more first protrusion. Each of the first protrusions is arranged at a position aligned with a respective position of one of the first receptions configured to receive the respective first protrusion in order to establish the first non-destructive detachable direct connection.

Embodiments may have the advantage, that first non-destructive detachable direct connections between the replacement teeth and the framework may be established by inserting the first protrusions into the first receptions. The retention sections may receive the replacement teeth by inserting the first protrusions into the first receptions.

In accordance with an embodiment, each of the first protrusions comprises a circumferential shape matching a shape of the aligned first reception. The first protrusions may have a circular, elliptical, or polygonal, e.g., square or rectangular, cross section. The first receptions may have matching cross sections. In accordance with an embodiment, the protrusions may have the form of elongated ridges or rails and the receptions may have the form of matching slots or notches. According to embodiments, the first protrusions may have identical cross sections. According to embodiments, the cross sections of the first protrusions may vary in shape and/or size.

In accordance with an embodiment, one or more of the first protrusions in form of an elongated ridge or rail may extend below a plurality of adjacent replacement teeth. The adjacent replacement teeth may be provided as a set of connected bridged replacement teeth with one or more of the first receptions in form of matching slots or notches extending across the bottom faces of the adjacent replacement teeth. Embodiments may have the advantage that adjacent replacement teeth may be attached as a unit allowing for increasing strength and speed of assembly.

In accordance with an embodiment, the first receptions are provided in form of blind holes extending into the replacement teeth.

In accordance with an embodiment, one or more of the first surface structures each comprises one or more first protrusions and one or more first receptions. In accordance with an embodiment, one or more of the first retention structures each comprises one or more first protrusions and one or more first receptions. Embodiments may have the advantage, that the mutual first non-destructive detachable direct connections between the first replacement teeth and the retention sections are strengthened. In case an adhesive is applied additionally the surface area of the bonded parts on which the adhesive may be distributed may be increased improving the adhesion.

In accordance with an embodiment, one or more of the first protrusions have a cylindrical shape or a polyhedral shape, e.g., a cubic shape or a cuboid shape. In accordance with an embodiment, circumferences of one or more of the first protrusions reduce from a base of the respective first protrusion towards the top of the respective first protrusion. In accordance with an embodiment, one or more of the first protrusions are tapered from the base of the respective first protrusion towards the top of the respective first protrusion. In accordance with an embodiment, one or more of the first protrusions have a form of a frustum, e.g., a conical frustum or a square frustum. In accordance with an embodiment the circumferential shape at the base of each of the first protrusions matches the shape of the aligned first reception, i.e., the shape of a mouth of the aligned first reception.

In accordance with an embodiment, the assembly set further comprises one or more upper artificial gingiva parts, each of the upper artificial gingiva parts being configured to be arranged on one of the retention sections and comprising one or more through-holes. Each of the through-holes are configured to receive one of the replacement teeth in order for the surface structure of the bottom face of the respective replacement tooth to engage the assigned complementary retention structure of the respective retention section. Embodiments may have the advantage, that the upper artificial gingiva parts may provide an artificial gingiva for the replacement teeth. Thus, the removable partial denture may for example fit to the patient's remaining denture without obvious visual disruptions.

The through-holes may allow for first non-destructive detachable direct connections being established between the replacement teeth arranged within the through-holes of the upper artificial gingiva parts and the framework. In accordance with an embodiment, one or more of the through-holes of the upper artificial gingiva parts are configured to receive a single replacement tooth each. In accordance with an embodiment, one or more of the through-holes of the upper artificial gingiva parts are configured to receive a plurality of replacement teeth each.

The upper artificial gingiva parts may cover at least parts of the framework, while sparing the retentions sections intended to retain the replacement teeth. For this purpose, the upper artificial gingiva parts may comprise through-holes allowing the replacement teeth to directly connect with the retention sections, when being arranged in the through-holes.

Embodiments may have the advantage, that the upper artificial gingiva parts may neither be required to contribute to the structural integrity of the removable partial denture nor to the retention of the replacement teeth. Structural integrity and retention may be provided by the framework. Thus, the upper artificial gingiva parts may rather be optimized to match a natural look, natural feeling and/or accurate fit in the patient's mouth. Therefore, more natural materials, e.g., softer and more flexible materials, may be used for the upper gingiva artificial gingiva parts.

In accordance with an embodiment, each of the upper artificial gingiva parts further comprises a bottom face with a second surface structure configured to engage an assigned complementary second retention structure provided by the retention section of the framework on which the respective upper artificial gingiva part is configured to be arranged on. Each second surface structure in combination with the assigned complementary second retention structure provides a second non-destructive detachable direct connection between the upper artificial gingiva part comprising the respective second surface structure and the retention section comprising the respective assigned complementary second retention structure.

Embodiments may have the advantage, that that the retention sections of the framework may receive upper artificial gingiva parts and retain the upper artificial gingiva parts via the respective non-destructive detachable direct connection. Thus, the upper artificial gingiva parts may be attached to the framework, i.e., the retention sections of the framework, which supports the upper artificial gingiva parts and hold them in a predefined position. According to embodiments, the structural integrity of the removable partial denture and thus of the upper artificial gingiva parts is provided by the framework supporting the respective upper artificial gingiva parts. The predefined position may be defined relative to the framework. In case one of the upper artificial gingiva parts shows a defect or a short-coming, it may be detached from the framework and replaced by another upper artificial gingiva parts.

In accordance with an embodiment, one or more of the second surface structures each comprises one or more second protrusions protruding from the bottom surface of the upper artificial gingiva part comprising the respective second surface structure. One or more of the second retention structures each comprises one or more second receptions for receiving the one or more second protrusions. Each of the second protrusions is arranged at a position aligned with a respective position of one of the second receptions configured to receive the respective second protrusion in order to establish the second non-destructive detachable direct connection.

Embodiments may have the advantage, that second non-destructive detachable direct connections between the upper artificial gingiva parts and the framework may be established by inserting the second protrusions in the second receptions. The retention sections may receive the upper artificial gingiva part by receiving the second protrusions in the second receptions.

In accordance with an embodiment, each of the second protrusions comprises a circumferential shape matching a shape of the aligned second reception. The second protrusions may have a circular, elliptical, or polygonal, e.g., square or rectangular, cross section. The second receptions may have matching cross sections. In accordance with an embodiment, the protrusions may have the form of elongated ridges or rails and the receptions may have the form of matching slots or notches. According to embodiments, the second protrusions may have identical cross sections. According to embodiments, the cross sections of the second protrusions may vary in shape and/or size.

In accordance with an embodiment, the second receptions are provided in form of blind holes extending into the retention section. In accordance with an embodiment, the second receptions are provided in form of through-holes extending through the retention sections. In accordance with an embodiment the through-holes extending through the retention sections form mesh structures with each of the through-holes providing an individual mesh of the mesh structure.

In accordance with an embodiment, one or more of the aligned second receptions each are configured to provide, when the second non-destructive detachable direct connection is established, a remaining free space at a top of the aligned and received second protrusion for receiving an adhesive in order to provide an additional second permanent connection between the upper artificial gingiva parts and the retention sections. Embodiments may have the advantage, that in addition to the non-destructive detachable direct connections permanent connections between the upper artificial gingiva parts and the retention sections may be provided. By filling the free space at a top of the aligned and received second protrusions, the non-destructive detachable connection may be transformed into a permanent connection. The non-destructive detachable direct connections may be used to connect the upper artificial gingiva parts to the framework for checking their proper fit. In case the check has been successful, the permanent connections may be established in order to strengthen the bonding.

In accordance with an embodiment, the bottom faces of the upper artificial gingiva parts and/or the retention structures comprises a plurality of additional recesses for receiving an adhesive in order to provide the additional second permanent connection between the upper artificial gingiva parts and the retention sections. Embodiments may have the advantage, that the adhesive may collect and harden in the recesses forming a stronger bond between the upper artificial gingiva parts and the retention sections.

In accordance with an embodiment, for each of the retention sections the one or more first retention structures of the respective retention section and the one or more second retention structure of the respective retention section are provided by a common retention structure configured to extend under the one or more replacement teeth to be carried by the respective retention section and under the one or more upper artificial gingiva parts to be arranged on the respective retention section. Embodiments may have the advantage, that a common retention structure may provide first and second non-destructive detachable direct connections, i.e., non-destructive detachable direct connections of the replacement teeth and the upper artificial gingiva parts to the framework.

In accordance with an embodiment, for each of the retention sections the one or more first retention structures of the respective retention section and the one or more second retention structure of the respective retention section are provided by a common mesh structure configured to extend under the one or more replacement teeth to be carried by the respective retention section and under the one or more upper artificial gingiva parts to be arranged on the respective retention section. Embodiments may have the advantage, that a common retention structure in form of a common mesh structure may provide first and second non-destructive detachable direct connections, i.e., non-destructive detachable direct connections of the replacement teeth and the upper artificial gingiva parts to the framework.

In accordance with an embodiment, one or more of the second retention structures each comprise one or more second protrusions protruding from the retention section comprising the respective second retention structure. One or more of the second surface structures each comprises one or more second receptions for receiving the one or more second protrusion. Each of the second protrusions is arranged at a position aligned with a respective position of one of the second receptions configured to receive the respective second protrusion in order to establish the second non-destructive detachable direct connection.

Embodiments may have the advantage, that second non-destructive detachable direct connections between the upper artificial gingiva parts and the framework may be established by inserting the second protrusions in the second receptions. The retention sections may receive the upper artificial gingiva parts by inserting the second protrusions into the second receptions.

In accordance with an embodiment, each of the second protrusions comprises a circumferential shape matching a shape of the aligned second reception. The second protrusions may have a circular, elliptical, or polygonal, e.g., square or rectangular, cross section. The second receptions may have matching cross sections. In accordance with an embodiment, the protrusions may have the form of elongated ridges or rails and the receptions may have the form of matching slots or notches. According to embodiments, the second protrusions may have identical cross sections. According to embodiments, the cross sections of the second protrusions may vary in shape and/or size.

In accordance with an embodiment, the second receptions are provided in form of blind holes extending into the upper artificial gingiva parts.

In accordance with an embodiment, one or more of the second surface structures each comprises one or more second protrusions and one or more second receptions. In accordance with an embodiment, one or more of the second retention structures each comprises one or more second protrusions and one or more second receptions. Embodiments may have the advantage, that the mutual second non-destructive detachable direct connections between the second upper artificial gingiva parts and the retention sections are strengthened. In case an adhesive is applied additionally, the surface area of the bonded parts on which the adhesive may be distributed may increase, improving the adhesion.

In accordance with an embodiment, one or more of the first protrusions have a cylindrical shape or a polyhedral shape, e.g., a cubic shape or a cuboid shape. In accordance with an embodiment, circumferences of one or more of the second protrusions reduce from a base of the respective second protrusion towards the top of the respective second protrusion. In accordance with an embodiment, one or more of the second protrusions are tapered from the base of the respective second protrusion towards the top of the respective second protrusion. In accordance with an embodiment, one or more of the second protrusions have a form of a frustum, e.g., a conical frustum or a square frustum. In accordance with an embodiment the circumferential shape at the base of each of the second protrusions matches the shape of the aligned second reception, i.e., the shape of a mouth of the aligned second reception.

In accordance with an embodiment, one or more of the upper artificial gingiva parts comprise one or more lateral sections laterally extending beyond the retention section of the framework on which the respective upper artificial gingiva part is configured to be arranged on. Each of the lateral sections comprises a bottom face being shaped to be placed on and match a surface of a natural gingiva of the patient. Embodiments may have the advantage, that the framework may laterally extend onto the natural gingiva of the patient ensuring a lateral covering of the framework without obvious visual disruptions. 3D organic objects, such as the human mouth with the gingiva, have geometrically highly complicated surfaces. The lateral sections with their bottom faces shaped to match the surface of the natural gingiva of the patient may ensure a precise and comfortable lateral fit of the removable partial denture. According to the lateral sections may provide for a smooth transition between the upper artificial gingiva parts and the natural gingiva of the patient.

In accordance with an embodiment the lateral sections extending vestibularly, e.g., labially or buccally, orally, e.g., palatally in case of a denture for the upper jaw or lingually in case of a denture for the lower jaw, and/or distally.

In accordance with an embodiment, the assembly set further comprises one or more lower artificial gingiva parts, each of the lower artificial gingiva parts being configured to be arranged between one of the retention sections and the natural gingiva of the patient. Each of the lower artificial gingiva parts comprises a top face and a bottom face. The bottom face is shaped to be placed on and match a surface of the natural gingiva of the patient. The top face comprises a third surface structure configured to engage an assigned complementary third retention structure provided by the retention section of the framework under which the respective lower artificial gingiva part being configured to be arranged. Each third surface structure in combination with the assigned complementary third retention structure provides a third non-destructive detachable direct connection between the lower artificial gingiva part comprising the respective third surface structure and the retention section comprising the respective assigned complementary third retention structure.

Embodiments may have the advantage, that the bottom faces of the lower artificial gingiva parts shaped to match the surface of the natural gingiva of the patient may ensure a precise and comfortable fit of the removable partial denture, even though 3D organic objects, such as the human mouth with the gingiva, have geometrically highly complicated surfaces.

Embodiments may have the advantage, that the retention sections of the framework may receive lower artificial gingiva parts and retain the lower artificial gingiva parts via the respective non-destructive detachable direct connection. Thus, the lower artificial gingiva parts may be attached to the framework, i.e., the retention sections of framework, which may rest on the lower artificial gingiva parts and retain them in a predefined position. According to embodiments, the structural integrity of the removable partial denture and thus of the lower artificial gingiva parts is provided by the framework. The predefined position may be defined relative to the framework. In case one of the lower artificial gingiva parts shows a defect or a short-coming, it may be detached from the framework and replaced by another lower artificial gingiva parts.

Embodiments may have the advantage, that the lower artificial gingiva parts may neither be required to contribute to the structural integrity of the removable partial denture nor to the retention of the replacement teeth. Structural integrity and retention may be provided by the framework. Thus, the lower artificial gingiva parts may rather be optimized to match a natural look, natural feeling and/or accurate fit in the patient's mouth. Therefore, more natural materials, e.g., softer and more flexible materials, may be used for the lower gingiva artificial gingiva parts.

Embodiments may have the advantage, that each of the lower artificial gingiva parts may provide a bottom face shaped to match a surface of the natural gingiva of the patient. The shape of the bottom faces of the lower artificial gingiva parts may for example be defined using a 3D scan of the patient's natural gingiva. The 3D scan may be used to provide a digital model of the patient's natural gingiva. The model may for example be based on a voxel engine allowing to map geometrically highly complicated surfaces, such as the human mouth. In this case voxels may be used for a digital representation of geometry of the patient's natural gingiva. For example, the model also may be based on a point cloud with the points of the point cloud providing a digital representation of geometry of the surface of the patient's natural gingiva. Also, alternative approaches for digitally representing the surface of the patient's natural gingiva may be used, like e.g. a polygon mesh with a collection of vertices, edges and faces that defines the respective surface.

Embodiments may have the advantage, that no additional manual steps of filling in artificial gingiva material on the bottom side of the framework and modelling the artificial gingiva material to match a surface of the natural gingiva of the patient may be required. For manual modelling artificial gingiva material in order to match a surface of the natural gingiva of the patient physical model may be required. Embodiments may have the advantage, that no such physical models, like stone/gypsum models, of the patient's jaw may be required to be used by a technician to manually create the underpart of the removable partial denture under the framework. The underpart of the removable partial denture may rather be provided by the bottom faces of the lower artificial gingiva parts intended to be placed on the remaining gingiva in the patient's mouth. The respective lower artificial gingiva parts may be digitally modelled using scan data on a computer system and produced according to the resulting digital model.

Using a physical model as a reference to model artificial gingiva material on the bottom side of the framework may result in inaccuracies due to differences between the physical reproduction of a patient's jaw and the actual jaw of the patient. This may in particular be the case for complex surfaces, like a remaining natural gingiva in the patient's mouth. Differences may for example arise, when shaping the physical model. Differences may further arise from changes of material used for creating the physical model. Such changes may for example occur during hardening of the material. For example, the material may shrink in size. Such changes may further occur during use of the physical model. Repeated adjusting of the artificial gingiva to match the surfaces provided by the physical model may cause wearing of the respective surfaces.

Furthermore, manually filling in artificial gingiva material, like acrylic, in gaps of missing gingiva, i.e., between the framework and the remaining natural gingiva of the patient may be prone to error. Too much artificial gingiva material may cause a general offset and fitting problems. Too little artificial gingiva material on the other hand may cause unwanted free spaces between the framework and the remaining natural gingiva of the patient. Such free spaces may result in a local lake pf support of the partial denture. Furthermore, such free spaces may provide pockets where bacteria could collect causing hygiene issues and discomfort.

Thus, manual approaches of shaping an artificial gingiva for a removable partial denture to match a patient's natural gingiva may often lake sufficient accuracy and thus may reduce comfort for the patient. Even though such short-comings may hardly be avoidable using manual approaches, trying to minimize these short-comings may cause the act of producing a removable partial denture and especially a bottom part designed to lie on the remaining natural gingiva of the patient to be a time consuming, complicated process requiring a high level of skills and experience in order to be executed suitably.

Embodiments may have the advantage, that even person with a lower level of skills and experience may be fit to fulfill the task of providing the replacement partial denture by assembling the assembly set and checking the fit of the respective partial denture. Minor manual adjustments may be performed without requiring any advanced qualifications.

An underpart of the replacement partial denture provided by the lower artificial gingiva parts digitally modelled using scan data of the natural gingiva of the patient and configured to sit on the remaining natural gingiva may be more accurate and provided a better fit as they comprise a bottom face with a shape being an exact antagonist to the scanned remaining gingiva of the patient.

Furthermore, since the teeth may be fit directly to the framework a more natural material, e.g., softer and more flexible material, may be used for the artificial gingiva parts, since those parts are neither required to provide structural integrity for the partial denture nor to hold the replacement teeth in their intended spots.

Embodiments may have the advantage, that an imperfection of the partial denture provided in form of an assembly set may easily be dealt with. Assuming such a partial denture shows deficits, such as an inaccurate match to the patient's jaw or an insufficient occlusion, e.g., when being provided to the patient at the dentist, such deficits may easily be corrected by replacing the parts showing deficits with deficiency-free replacement parts. In contrast, a partial denture provided as an end-product without non-destructive detachable connections allowing for a non-destructive replacement of inaccurate parts may provide only minor possibilities for further adjustments at most. This may for example be the case, if all the parts of the removable partial denture are already glued together generating connections not detachable without destruction. In such a case, it may be rather necessary to assume that the end-product, e.g., when being provided to the patient at the dentist, perfectly fits the patient without requiring further adjustments. If the fit turns out to be insufficient, the partial denture as a whole may have to be replaced by a new one. Providing a new partial denture may require to repeat the complete procedure of scanning the patient mouth as well as modelling and producing the partial denture once again. Embodiments may allow to avoid the aforementioned disadvantages and rather provide the possibility to assemble the partial denture provided in form of an assembly set using non-destructive detachable connections and to try its fit, before finally bonding the parts together using permanent connections, e.g., by using adhesives.

In accordance with an embodiment, one or more of the third surface structures each comprises one or more third protrusions protruding from the top face of the lower artificial gingiva part comprising the respective third surface structure. One or more of the third retention structures each comprises one or more third receptions for receiving the one or more third protrusions. Each of the third protrusions is arranged at a position aligned with a respective position of one of the third receptions configured to receive the respective third protrusion in order to establish the third non-destructive detachable direct connection.

Embodiments may have the advantage, that third non-destructive detachable direct connections between the lower artificial gingiva parts and the framework may be established by inserting the third protrusions into the third receptions. The retention sections may receive the lower artificial gingiva parts by receiving the third protrusions in the third receptions.

In accordance with an embodiment, each of the third protrusions comprises a circumferential shape matching a shape of the aligned third reception. The third protrusions may have a circular, elliptical, or polygonal, e.g., square or rectangular, cross section. The third receptions may have matching cross sections. In accordance with an embodiment, the protrusions may have the form of elongated ridges or rails and the receptions may have the form of matching slots or notches. According to embodiments, the third protrusions may have identical cross sections. According to embodiments, the cross sections of the third protrusions may vary in shape and/or size.

In accordance with an embodiment, the third receptions are provided in form of blind holes extending into the retention section. In accordance with an embodiment, the third receptions are provided in form of through-holes extending through the retention sections. In accordance with an embodiment the through-holes extending through the retention sections form mesh structures with each of the through-holes providing an individual mesh of the mesh structure.

In accordance with an embodiment, one or more of the aligned third receptions each are configured to provide, when the third non-destructive detachable direct connection is established, a remaining free space at a top of the aligned and received third protrusion for receiving an adhesive in order to provide an additional third permanent connection between the lower artificial gingiva parts and the retention sections. Embodiments may have the advantage, that in addition to the non-destructive detachable direct connections permanent connections between the lower artificial gingiva parts and the retention sections may be provided. By filling the free space at a top of the aligned and received third protrusions, the non-destructive detachable connection may be transformed into a permanent connection. The non-destructive detachable direct connections may be used to connect the lower artificial gingiva parts to the framework for checking their proper fit. In case the check has been successful, the permanent connections may be established in order to strengthen the bonding.

In accordance with an embodiment, the bottom faces of the lower artificial gingiva parts and/or the retention structures comprises a plurality of additional recesses for receiving an adhesive in order to provide the additional third permanent connection between the lower artificial gingiva parts and the retention sections. Embodiments may have the advantage, that the adhesive may collect and harden in the recesses forming a stronger bond between the lower artificial gingiva parts and the retention sections.

In accordance with an embodiment, one or more of the first protrusions have a cylindrical shape or a polyhedral shape, e.g., a cubic shape or a cuboid shape. In accordance with an embodiment, circumferences of one or more of the third protrusions reduce from a base of the respective third protrusion towards the top of the respective third protrusion. In accordance with an embodiment, one or more of the third protrusions are tapered from the base of the respective third protrusion towards the top of the respective third protrusion. In accordance with an embodiment, one or more of the third protrusions have a form of a frustum, e.g., a conical frustum or a square frustum. In accordance with an embodiment the circumferential shape at the base of each of the third protrusions matches the shape of the aligned third reception, i.e., the shape of a mouth of the aligned third reception.

In accordance with an embodiment, for each of the retention sections the one or more first retention structures of the respective retention and the one or more third retention structures of the respective retention section are provided by the same retention structure configured to extend under the one or more replacement teeth to be received by the respective retention section and on the one or more lower artificial gingiva parts to be arranged under the respective retention section. Embodiments may have the advantage, that the same retention structure may provide first and third non-destructive detachable direct connections, i.e., non-destructive detachable direct connections of the replacement teeth and the lower artificial gingiva parts to the framework.

In accordance with an embodiment, for each of the retention sections the one or more first retention structures of the respective retention and the one or more third retention structures of the respective retention section are provided by the same mesh structure configured to extend under the one or more replacement teeth to be received by the respective retention section and on the one or more lower artificial gingiva parts to be arranged under the respective retention section. Embodiments may have the advantage, that the same retention structure in form of the same mesh structure may provide first and third non-destructive detachable direct connections, i.e., non-destructive detachable direct connections of the replacement teeth and the lower artificial gingiva parts to the framework.

In accordance with an embodiment, one or more of the third retention structures each comprise one or more third protrusions protruding from the retention section comprising the respective third retention structure. One or more of the third surface structures each comprises one or more third receptions for receiving the one or more third protrusion. Each of the third protrusions is arranged at a position aligned with a respective position of one of the third receptions configured to receive the respective third protrusion in order to establish the third non-destructive detachable direct connection.

Embodiments may have the advantage, that third non-destructive detachable direct connections between the lower artificial gingiva parts and the framework may be established by inserting the third protrusions in the third receptions. The retention sections may receive the lower artificial gingiva parts by inserting the third protrusions into the third receptions.

In accordance with an embodiment, each of the third protrusions comprises a circumferential shape matching a shape of the aligned third reception. The third protrusions may have a circular, elliptical, or polygonal, e.g., square or rectangular, cross section. The third receptions may have matching cross sections. In accordance with an embodiment, the protrusions may have the form of elongated ridges or rails and the receptions may have the form of matching slots or notches. According to embodiments, the third protrusions may have identical cross sections. According to embodiments, the cross sections of the third protrusions may vary in shape and/or size.

In accordance with an embodiment, the third receptions are provided in form of blind holes extending into the lower artificial gingiva parts.

In accordance with an embodiment, one or more of the third surface structures each comprises one or more third protrusions and one or more third receptions. In accordance with an embodiment, one or more of the third retention structures each comprises one or more third protrusions and one or more third receptions. Embodiments may have the advantage, that the mutual third non-destructive detachable direct connections between the third lower artificial gingiva parts and the retention sections are strengthened. In case an adhesive is applied additionally, the surface area of the bonded parts on which the adhesive may be distributed may increase, improving the adhesion.

In another aspect, the invention relates to a removable partial denture for a patient. The partial denture comprises one or more replacement teeth, a framework with one or more retention sections as well as one or more upper artificial gingiva parts and one or more lower artificial gingiva parts.

Each of the retention sections is configured to receive and retain one or more of the replacement teeth. Each of the upper artificial gingiva parts is arranged on one of the retention sections and comprising one or more through-holes. One of the replacement teeth is arranged in each of the through-holes. Each of the replacement teeth comprises a bottom face with a first surface structure engaging an assigned complementary first retention structure provided by one of the retention sections of the framework configured to receive and retain the respective replacement tooth. Each first surface structure in combination with the engaged complementary first retention structure forms a non-destructive detachable direct connection between the replacement tooth comprising the respective surface structure and the retention section comprising the respective engaged complementary retention structure.

Each of the lower artificial gingiva parts is configured to be arranged between one of the retention sections and the natural gingiva of the patient. Each of the lower artificial gingiva parts comprises a top face and a bottom face. The bottom face is shaped to be placed on and match a surface of the natural gingiva of the patient. The top face comprises a further surface structure engaging an assigned complementary further retention structure provided by the retention section of the framework under which the respective lower artificial gingiva part being arranged. Each further surface structure in combination with the engaged complementary further retention structure forms a further non-destructive detachable direct connection between the lower artificial gingiva part comprising the respective further surface structure and the retention section comprising the respective engaged complementary further retention structure.

The removable partial denture may result from assembling any of the aforementioned embodiments of the assembly set. The removable partial denture may comprise any of the feature of the aforementioned embodiments of the assembly set.

Embodiments may have the advantage, that parts of the partial denture may be replaced without replacing the full partial denture. For instance, worn or broken parts may be replaced. Since structural integrity of the partial denture is for example provided by the framework alone, other parts like artificial gingiva parts may individually be replaced without weakening the structural integrity of the partial denture.

In accordance with an embodiment, each of the upper artificial gingiva parts further comprises a bottom face with a second surface structure engaging an assigned complementary second retention structure provided by the retention section of the framework on which the respective upper artificial gingiva part being arranged on. Each second surface structure in combination with the assigned complementary second retention structure forms a second non-destructive detachable direct connection between the upper artificial gingiva part comprising the respective second surface structure and the retention section comprising the respective assigned complementary second retention structure.

In another aspect, the invention relates to a computer system for constructing an assembly set for a removable partial denture for a patient. The computer system comprises a processor and a memory storing machine-executable program instructions. Execution of the program instructions by the processor causes the processor to control the computer system to provide a digital model of one or more replacement teeth for the assembly set. Further, a digital model of one or more artificial gingiva parts is provided. Each of the artificial gingiva parts comprises a top face and a bottom face. Each of the bottom faces is shaped to be placed on and match a surface of a natural gingiva of the patient.

Each of the one or more artificial gingiva parts is split in a lower artificial gingiva part comprising at least part of the bottom face of the respective artificial gingiva part and an upper artificial gingiva part comprising the top face of the respective artificial gingiva part. Furthermore, a digital model of the framework is generated with one or more retention sections. The retention sections comprise retention structures configured for providing non-destructive detachable direct connections to at least the one or more replacement teeth and the lower artificial gingiva parts. The digital model of the framework is subtracted from the digital model of the one or more replacement teeth and from the digital model of the lower artificial gingiva part to generate a surface structure on a bottom face of each replacement teeth configured to engage one of the retention structures provided by one of the retention sections of the framework and to generate a further surface structure on a top face of each lower artificial gingiva part configured to engage one of the retention structures provided by one of the retention sections of the framework.

The computer system may be configured for constructing any of the aforementioned embodiments of the assembly set.

The digital models may for example be based on a 3D scan of a patient's mouth and/or jaw. The digital models may for example be provided using a voxel engine with voxels being used for a digital representation of geometry. Alternatively, other digital representations, like e.g. point clouds or polygon meshes, may be used. Such a scan may be direct scan of patient. Alternatively, the scan may be a scan of a dental impression-based model of the jaw. A dental impression of the patient's mouth and/or jaw may be used as a negative for generating a dental impression-based model. Such a model may for example be a stone or gypsum model.

Embodiments may have the advantage, that a digital model of the framework may be used to define the layout of the framework and adjust the framework to the surfaces of a given geometry defined by the patient's mouth and jaw. Thus, a need to use a deformable material, like e.g. wax, to form and adjust a positive of a model of the framework, e.g., using an impression-based model of the patient's jaw, may be avoided. The digital model of the framework generated and adjusted using the computer system may rather be used directly as a blueprint for producing the framework. The framework may, e.g., be made from metal.

The digital model of the framework may have the advantage that the framework may be designed on a computer system graphically defining different sections of the framework. The digital model of the framework may comprise a definition of an offset over an area of the patient's mouth, where the replacement teeth are to be added. A retention section of the framework may be added over the offset. The offset may be added so that the retention mesh does not touch the patient's mouth, i.e., the patient's natural gingiva. In the removable partial denture, the offset may be provided by the lower artificial gingiva parts.

Furthermore, the retention section provides a surface for attaching materials to, like artificial gingiva parts and/or replacement teeth.

The digital model of the replacement teeth may for example define the geometry and the positions of the replacement teeth. The positions of the replacement teeth may be defined relative to each other and/or relative to a digital model of the patient's mouth and/or jaw.

The digital model of the replacement teeth may comprise one or more teeth fitting to the patient's mouth. These teeth are chosen to replace missing teeth in the patient's mouth. For providing the digital model of the replacement teeth scans of pre-existing, pre-extraction teeth may be used or existing teeth may be mirrored, like e.g. remaining antagonists.

Furthermore, models of teeth from libraries with generic teeth may be used. The replacement teeth of the digital model may be modified and adjusted to precisely match the geometry provided in the patient's mouth. For example, the replacement teeth may be modified and adjusted to precisely match opposing teeth, i.e., antagonists, in the patient's mouth. For example, the replacement teeth within the digital model may be rearranged in such a way that the occlusion is optimized. Thus, the relationship between the maxillary, i.e., upper, and mandibular, i.e., lower teeth, when approaching each other, like e.g. during chewing motions or at rest, may be adjusted to the individual geometry of the patient's mouth.

The digital model of the artificial gingiva parts may define an artificial gingiva with a bottom face shaped to be arranged on and match the natural gingiva of the patient. The artificial gingiva may be configured to receive and/or surround the one or more replacement teeth.

In accordance with an embodiment, the different types of elements of the removable partial denture may be virtually combined.

In accordance with an embodiment, the method may further comprise producing the assembly set. The different types of elements of the assembly set may be produced separately. The replacement teeth may be provided in form of generic preproduced replacement teeth. These generic replacement teeth may for example correspond to digital tooth models provided by teeth libraries. The preproduced replacement teeth may be used as they are or may be modified to match the patient's individual denture, e.g., to match an antagonist.

According to embodiments, the surface structures of the bottom faces of the replacement teeth may have a generic geometry and the retention structures of the framework are configured to match the geometry of the surface structures in order to ensure a firm non-destructive detachable direct connection between the replacement teeth and the framework.

According to embodiments, the surface structures of the bottom faces of the replacement teeth are modified, e.g., machined, to match the geometry of the retention structures of the framework in order to ensure a firm non-destructive detachable direct connection between the replacement teeth and the framework. The retention structures may comprise individual geometries specific for the patient depending on the form of the framework, which is adjusted to the individual geometry of the patient denture to be added by the removable partial denture.

According to embodiments, the replacement teeth may be produced for the patient using the digital model of the replacement teeth adjusted to the individual geometry of the patient denture to be added by the removable partial denture. The replacement teeth may for example be produced using blanks which are machined in order shape the same according to a geometry defined by the digital model of the replacement teeth.

In accordance with an embodiment, the framework may be produced according to a geometry defined by the digital model of the framework. The framework may for example be made from metal. According to embodiments, the framework may be printed using a 3D printer. According to embodiments, the framework may be produced using machining. Also, hybrid production methods may be used as well. For instance, the framework may be printed in metal, while sections that require higher accuracy may be machined, like e.g. telescopes or bars.

In accordance with an embodiment, the upper and lower artificial gingiva parts may be produced according to geometries defined by the split digital model of the artificial gingiva parts, which has been adjusted to the individual geometry of the patient denture to be added by the removable partial denture. In particular, the lower artificial gingiva parts may have been adjusted to a natural gingiva of the patient. The upper and lower artificial gingiva parts may for example be printed using a 3D printer.

In accordance with an embodiment, the different elements of the assembly set may be printed by different 3D printers handling different types of materials. Furthermore, the colors of the material handled may differ. In accordance with an embodiment, the different elements of the assembly set may be printed by the same 3D printer capable of handling different materials, e.g., with different colors.

In another aspect, the invention relates to a computer program product comprising a non-volatile computer-readable storage medium having computer-readable program code embodied therewith for constructing an assembly set for a removable partial denture for a patient.

The constructing comprises a providing of a digital model of one or more replacement teeth for the assembly set. A digital model of one or more artificial gingiva parts is generated. Each of the artificial gingiva parts comprises a top face and a bottom face. Each of the bottom faces is shaped to be placed on and match a surface of a natural gingiva of the patient.

Each of the one or more artificial gingiva parts is split in a lower artificial gingiva part comprising at least part of the bottom face of the respective artificial gingiva part and an upper artificial gingiva part comprising the top face of the respective artificial gingiva part. Furthermore, a digital model of the framework is generated with one or more retention sections, the retention sections comprising retention structures configured for providing non-destructive detachable direct connections to at least the one or more replacement teeth and the lower artificial gingiva parts. The digital model of the framework is subtracted from the digital model of the one or more replacement teeth and from the digital model of the lower artificial gingiva part to generate a surface structure on a bottom face of each replacement teeth configured to engage one of the retention structures provided by one of the retention sections of the framework and to generate a further surface structure on a top face of each lower artificial gingiva part configured to engage one of the retention structures provided by one of the retention sections of the framework.

The computer-readable program code of the computer program product may be configured for constructing any of the aforementioned embodiments of the assembly set.

In another aspect, the invention relates to a method for constructing an assembly set for a removable partial denture for a patient. The method comprises providing a digital model of one or more replacement teeth for the assembly set. A digital model of one or more artificial gingiva parts is generated. Each of the artificial gingiva parts comprises a top face and a bottom face. Each of the bottom faces is shaped to be placed on and match a surface of a natural gingiva of the patient.

Each of the one or more artificial gingiva parts is split in a lower artificial gingiva part comprising at least part of the bottom face of the respective artificial gingiva part and an upper artificial gingiva part comprising the top face of the respective artificial gingiva part. Furthermore, a digital model of the framework is generated with one or more retention sections. The retention sections comprise retention structures configured for providing non-destructive detachable direct connections to at least the one or more replacement teeth and the lower artificial gingiva parts. The digital model of the framework is subtracted from the digital model of the one or more replacement teeth and from the digital model of the lower artificial gingiva part to generate a surface structure on a bottom face of each replacement teeth configured to engage one of the retention structures provided by one of the retention sections of the framework and to generate a further surface structure on a top face of each lower artificial gingiva part configured to engage one of the retention structures provided by one of the retention sections of the framework.

The method may comprise constructing any of the aforementioned embodiments of the assembly set.

The subtraction of the digital model of the framework from the digital model of the one or more replacement teeth may have the advantage that a matching of the surface structure on a bottom face of the replacement teeth with the retention structures provided by one of the retention sections of the framework may be ensured. Thus, non-destructive detachable direct connections between the replacement teeth and the retention sections of the framework may be enabled. The non-destructive detachable direct connections between the replacement teeth and the retention sections of the framework may enable the framework to retain the replacement teeth in intended locations and positions according to the combined digital model of the replacement teeth and the framework.

In accordance with an embodiment the digital model of the framework in combination with the digital model of the lower artificial gingiva parts comprising a surface structure on each top face of each of the lower artificial gingiva parts is subtracted from the digital model of the one or more replacement teeth to generate a bottom face of each replacement teeth in combination with a surface structure on each of the respective bottom faces configured to engage one of the retention structures provided by one of the retention sections of the framework.

In accordance with an embodiment the method further comprises subtracting the digital model of the one or more replacement teeth from the digital model of the one or more upper artificial gingiva parts to configure the artificial gingiva parts to receive the one or more replacement teeth within the top faces configured to provide an artificial gingiva surface at least partially surrounding the received one or more of the replacement teeth.

In accordance with an embodiment the method further comprises subtracting free spaces from the one or more replacement teeth, the upper and/or the lower artificial gingiva parts for receiving an adhesive in order to provide additional permanent connections between the retention sections of the framework and the one or more replacement teeth, the upper and/or the lower artificial gingiva parts, respectively.

The framework may be subtracted from the replacement teeth in such a way that spaces for the adhesive may be provided, while still providing sufficient support for retaining the replacement teeth in the intended locations and positions on the framework by the non-destructive detachable direct connections. The adhesive may be applied to transform the non-destructive detachable direct connections between the replacement teeth and the retention sections into permanent connections ensured by the adhesive. The non-destructive detachable direct connections between the replacement teeth and the retention sections, when being stabled, may adjust the replacement teeth in intended locations and positions on the framework and ensure that the replacement teeth stay at the respective locations and positions, when the permanent connections are established using the adhesive.

In another aspect, the invention relates to a method for assembling an assembly set for a removable partial denture for a patient, the assembly set comprising one or more replacement teeth, a framework with one or more retention sections as well as one or more upper artificial gingiva parts and one or more lower artificial gingiva parts.

The method comprises arranging each of the upper artificial gingiva parts on one of the retention sections, each of the upper artificial gingiva parts comprising one or more through-holes. In each of the through-holes one of the replacement teeth is arranged with a surface structure at a bottom face of the respective replacement tooth engaging with an assigned complementary retention structure of one of the retention sections of the framework configured to receive and retain the respective replacement tooth. Each surface structure in combination with the engaged complementary retention structure forms a non-destructive detachable direct connection between the replacement tooth comprising the respective surface structure and the retention section comprising the respective engaged complementary retention structure.

Each of the lower artificial gingiva parts is arranged under one of the retention sections. Each of the lower artificial gingiva parts comprises a top face and a bottom face. The bottom face is shaped to be placed on and match a surface of the natural gingiva of the patient. The top face comprises a further surface structure engaging an assigned complementary further retention structure provided by the retention section of the framework under which the respective lower artificial gingiva part being arranged. Each further surface structure in combination with the engaged complementary further retention structure provides a further non-destructive detachable direct connection between the lower artificial gingiva part comprising the respective further surface structure and the retention section comprising the respective engaged complementary further retention structure.

The method for assembling may comprise assembling any of the aforementioned embodiments of the assembly set.

Embodiments may have the advantage, that removable partial denture may be checked for a correct positioning and form of the different elements. In case there are deviations from the planned positions, modifications may be performed. For performing the elements may, e.g., be dissembled, modified or replaced and reassembled. In case the positions and forms of the different elements of the assembled removable partial denture are correct, the elements may be dissembled again. Predefined free spaces between the replacement teeth and the framework may be filled with an adhesive and removable partial denture may be reassembled. If done correctly, the replacement teeth may fall into the planned spaces of the retention sections of the framework in a correct positioning, in which they may be fixed by the adhesive.

The above described examples and embodiments may be combined freely as long as the combinations are not mutually exclusive.

Figure 2:
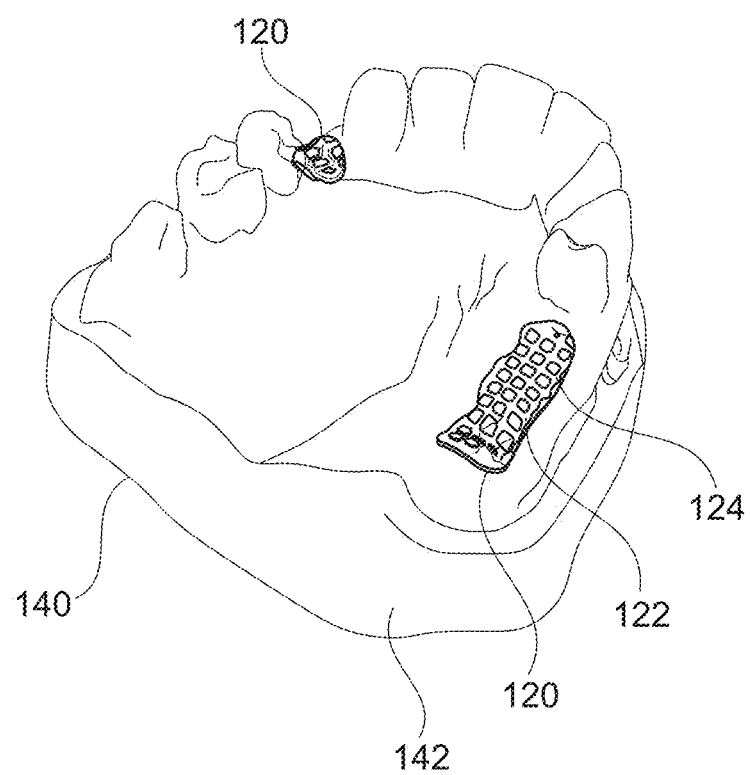
Figure 3:
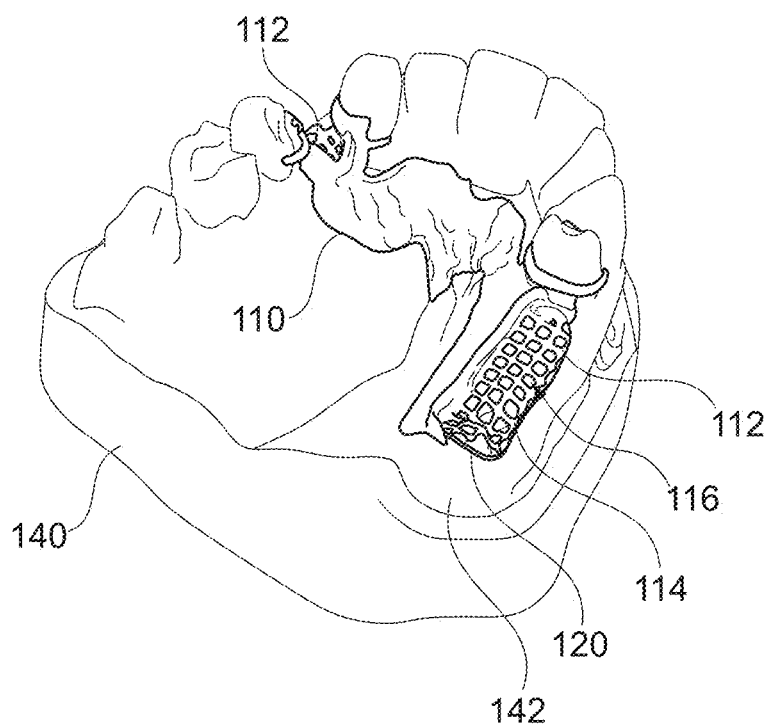
Figure 4:
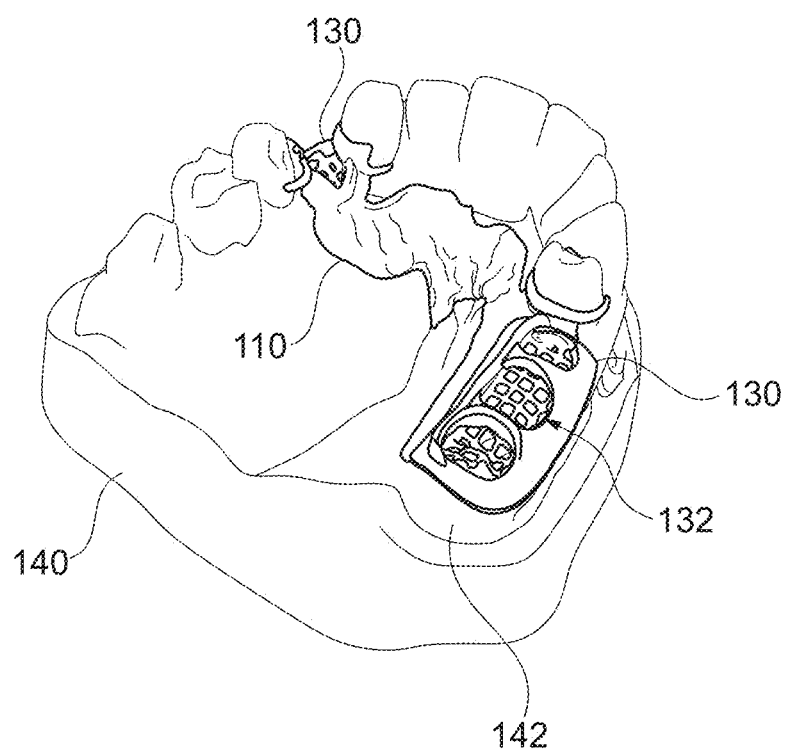
Figure 5:
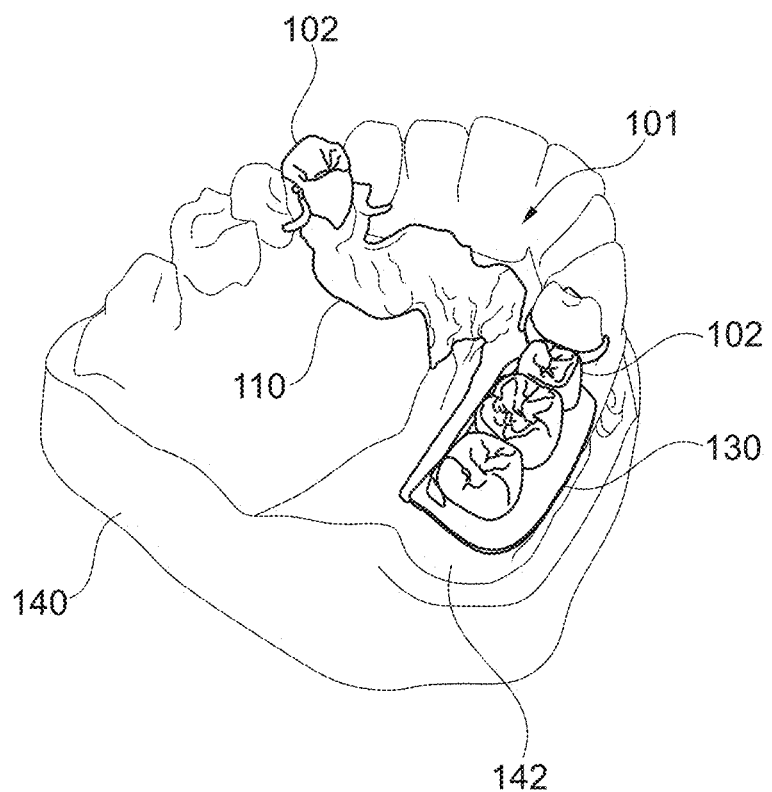
Figure 6:
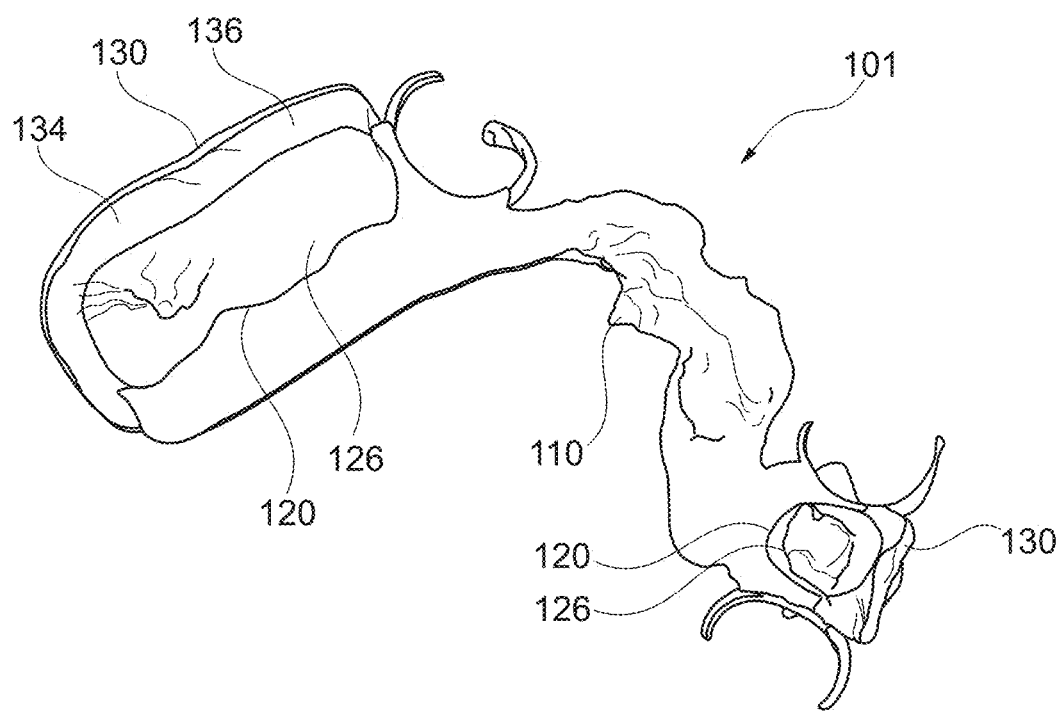
Figure 7:
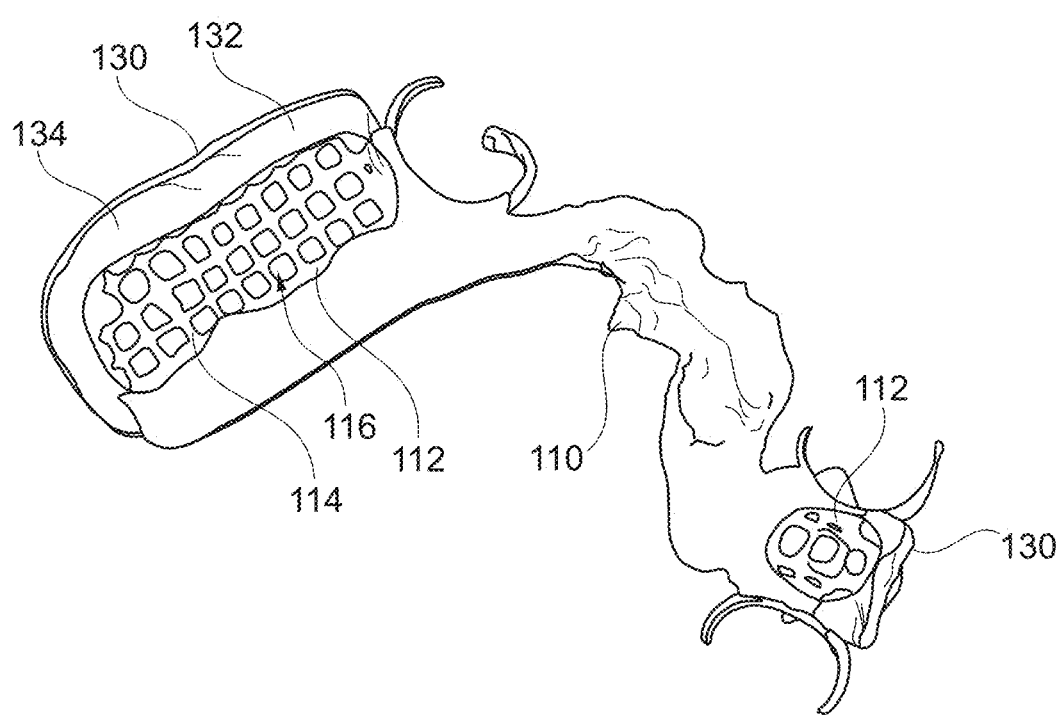
Figure 8:
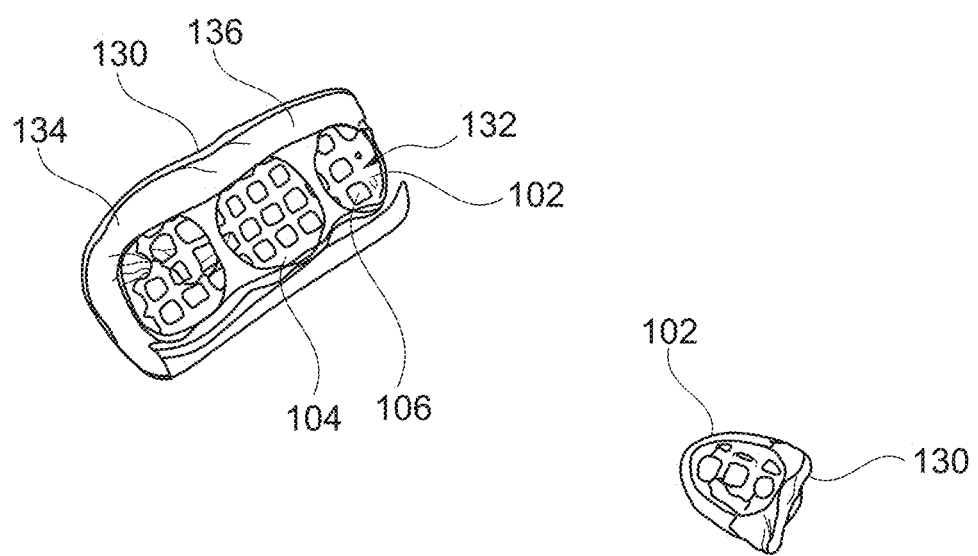
Figure 9:
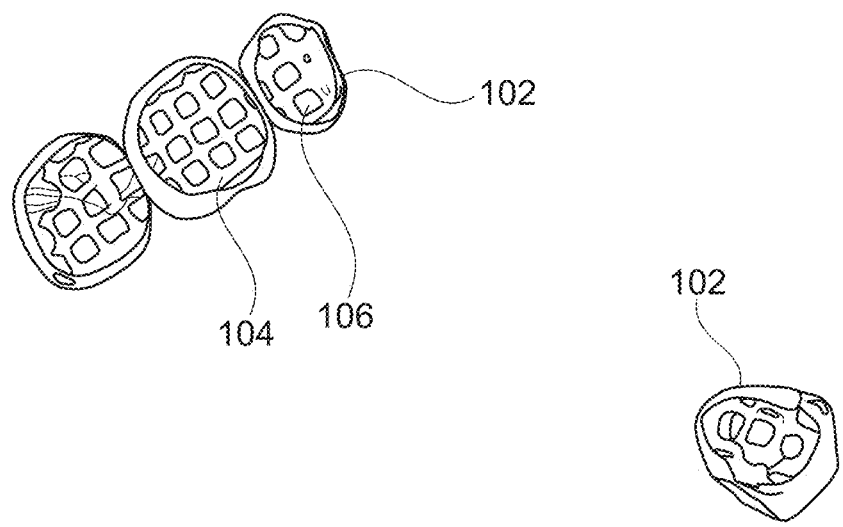
Figure 10:
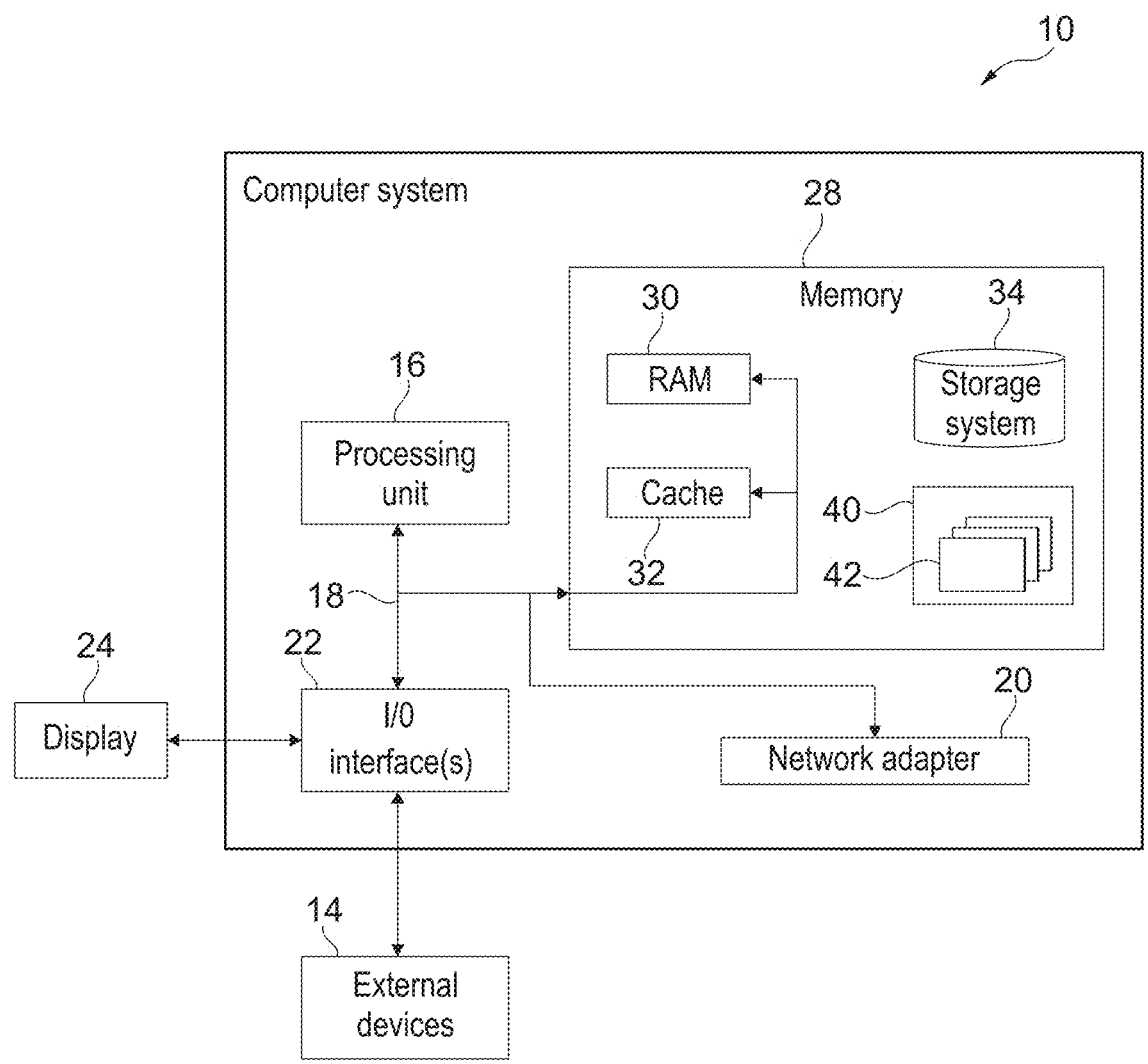
Figure 11:
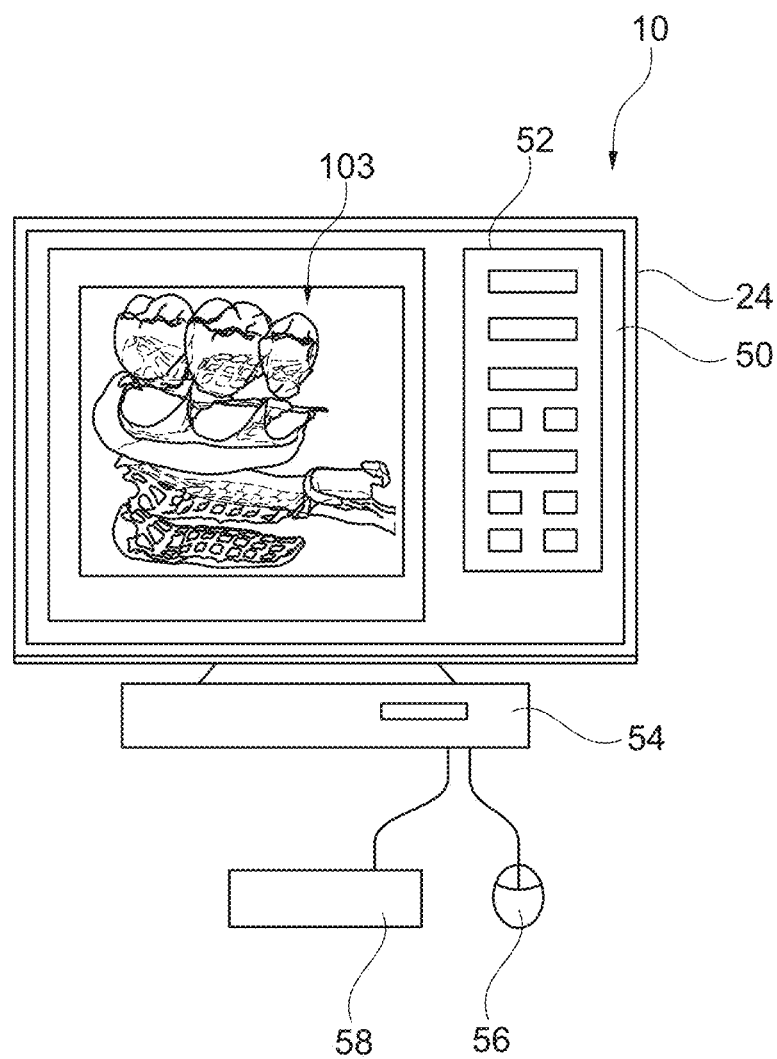
Figure 12:
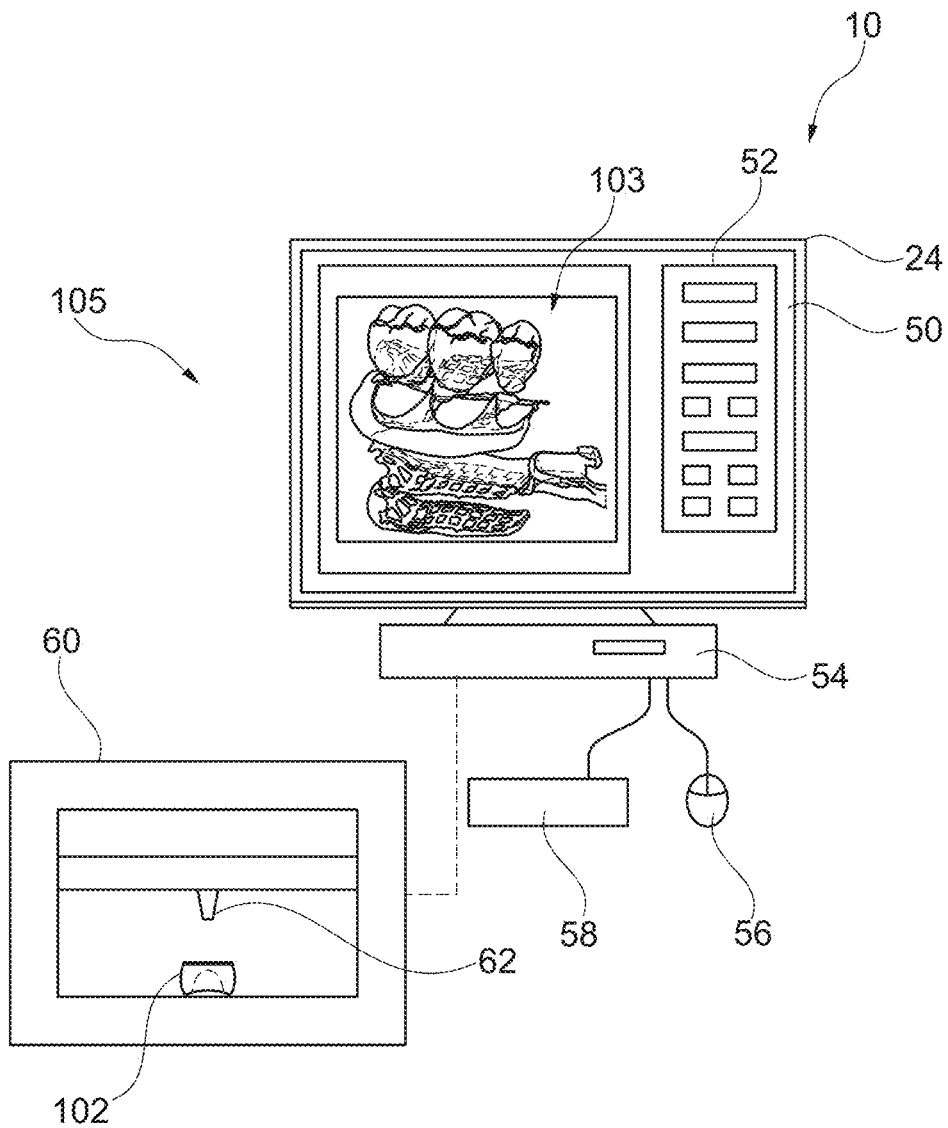
Figure 13:
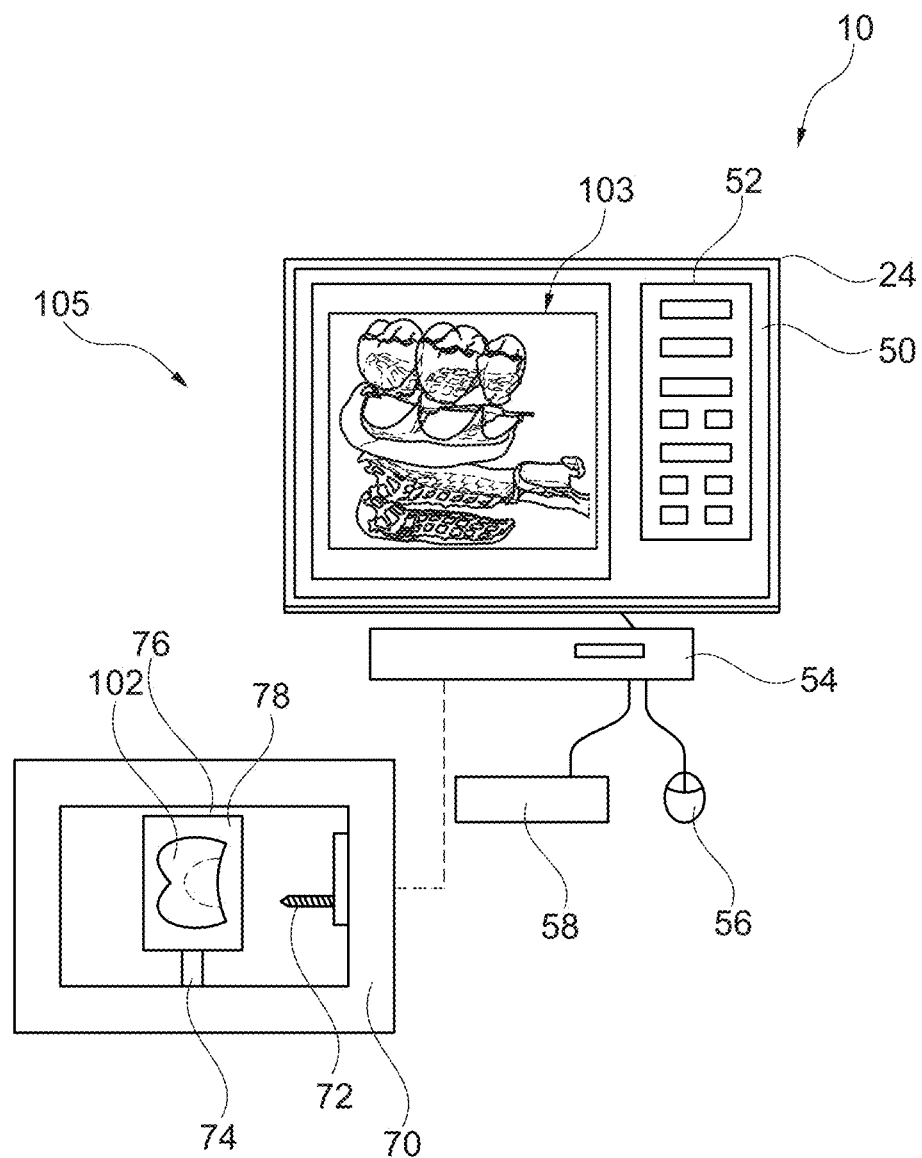
Figure 14:
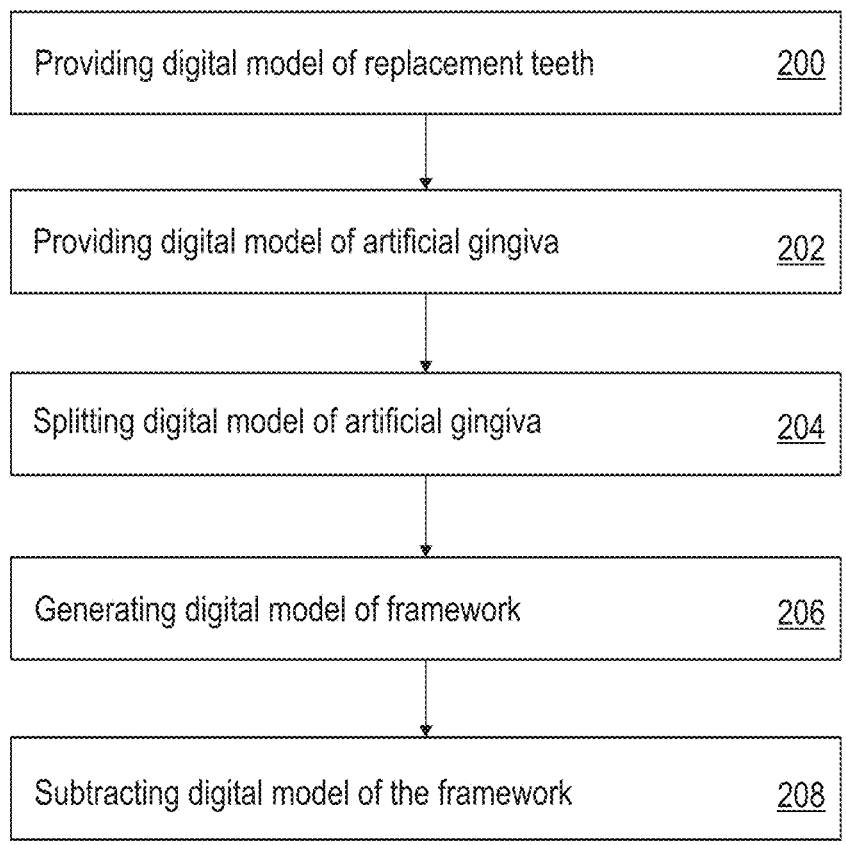
Figure 15:
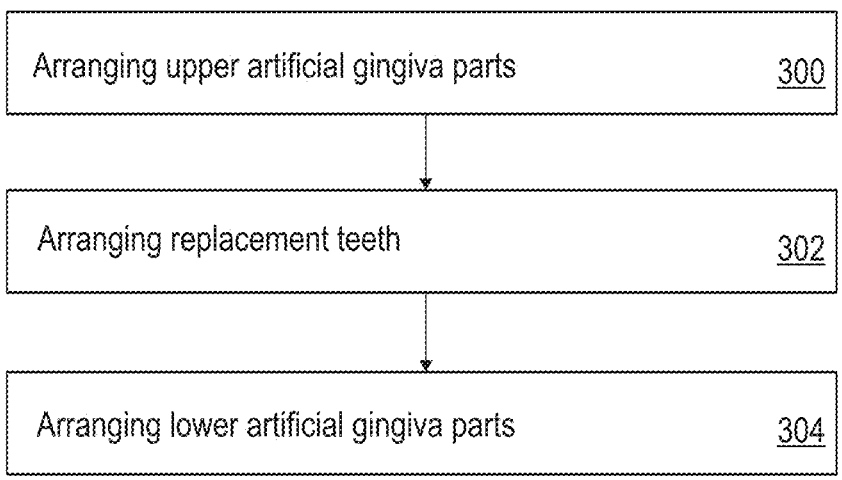

In the following, embodiments of the invention are described in greater detail in which FIG. 1 shows an exemplary embodiment of an assembly set for a removable partial denture, FIG. 2 shows elements of an exemplary embodiment of an assembly set for a removable partial denture, FIG. 3 shows elements of an exemplary embodiment of an assembly set for a removable partial denture, FIG. 4 shows elements of an exemplary embodiment of an assembly set for a removable partial denture, FIG. 5 shows elements of an exemplary embodiment of an assembly set for a removable partial denture, FIG. 6 shows elements of an exemplary embodiment of an assembly set for a removable partial denture, FIG. 7 shows elements of an exemplary embodiment of an assembly set for a removable partial denture, FIG. 8 shows elements of an exemplary embodiment of an assembly set for a removable partial denture, FIG. 9 shows elements of an exemplary embodiment of an assembly set for a removable partial denture, FIG. 10 shows an exemplary embodiment of a computer system for constructing a removable partial denture, FIG. 11 shows an exemplary embodiment of a computer system for constructing a removable partial denture, FIG. 12 shows an exemplary embodiment of a production system for constructing a removable partial denture, FIG. 13 shows an exemplary embodiment of a production system for constructing a removable partial denture, FIG. 14 shows a flowchart illustrating an exemplary embodiment of a method for constructing a removable partial denture, and FIG. 15 shows a flowchart illustrating an exemplary embodiment of a method for assembling an assembly set of a removable partial denture.

In the following similar features are denoted by the same reference numerals.

FIG. 1 shows an exemplary assembly set 100 for a removable partial denture. The assembly set 100 comprises a framework 110 providing stability to the removable partial dentures ensuring its structural integrity. The assembly set 100 further comprises a plurality of replacement teeth 102, a lower artificial gingiva 120 and an upper artificial gingiva 130. The framework 110 comprises a retention section 112 configured to receive and retain the replacement teeth 102. The retention section 112 comprises a retention structure 114. The exemplary retention structure 114 comprises a plurality of receptions 116 configured as through-holes. Thus, the retention structure 114 has the form of a mesh-structure comprising a plurality of meshes each being provided by one of the through-holes 116. According to alternative embodiments, the receptions 116 could for example have the form of blind holes. The replacement teeth 102 each comprise a bottom face with a surface structure 104, e.g., comprising a plurality of protrusions 106. The surface structures 104 are each configured to engage the complementary retention structure 114 provided by the retention section 112 of the framework 110. By engaging the complementary retention structure 114 each surface structure 104 in combination with the respective complementary retention structure 114 provides a non-destructive detachable direct connection between one of the replacement teeth 102 and the framework 110, more precisely the retention section 112. In order to enable non-destructive detachable direct connections between the replacement teeth 102 and the framework 110, the upper artificial gingiva 130 comprises through-holes 132, in which the replacement teeth 102 may be placed to directly connect to the retention section 112. The upper artificial gingiva part 130 may also comprise a surface structure on a bottom face, e.g., similar to the surface structures 104 of the replacement teeth 102, to establish a non-destructive detachable direct connection with the retention structure 114 of the retention section 112 extending beneath the upper artificial gingiva part 130. The lower artificial gingiva part 120 is arranged beneath the retention section 112. The lower artificial gingiva part 120 comprises a bottom face shaped to be placed on and match a surface of the natural gingiva of the patient. An upper face the lower artificial gingiva part 120 may comprise a surface structure 122, e.g., similar to the surface structures 104 of the replacement teeth 102, to establish a non-destructive detachable direct connection with the retention structure 114 of the retention section 112. The surface structure 122 may for example comprise a plurality of protrusions 124 configured to be inserted into the receptions 116 of the retention structure in order to establish the non-destructive detachable direct connection between the lower artificial gingiva part 120 and the framework 110.

FIG. 2 shows a digital model 140 of a jaw with the remaining denture of a partially edentulous patient. The digital model 140 may result from a 3D scan of the patient's mouth and may comprise a surface of the patient's remaining natural gingiva 142. On the patient's natural gingiva 142 lower artificial gingiva parts 120 are arranged. The lower artificial gingiva parts 120 may each comprise a bottom face shaped to be placed on and match the surface of the natural gingiva 142 of the patient. The lower artificial gingiva parts 120 may further comprise surface structures 122 configured to establish non-destructive detachable direct connections with retention structures of retention sections of a framework. The surface structures 122 of the lower artificial gingiva parts 120 may, e.g., comprise a plurality of protrusions 124.

FIG. 3 shows the digital model 140 of FIG. 2 with a framework 110 arranged on the lower artificial gingiva parts 120. The framework 110 comprises retention sections 112 configured to receive and retain replacement teeth. The retention sections 112 each comprise a retention structure 114 with receptions 116, e.g., in the form of through-holes, to establish non-destructive detachable direct connections with the lower artificial gingiva parts 120.

FIG. 4 shows the digital model 140 of FIG. 3 with upper artificial gingiva parts 130 arranged on the retention sections 112 of the framework 110. The upper artificial gingiva parts 130 each may comprise one or more through-holes 132 configured for receiving one or more replacement teeth and enabling direct connections between the replacement teeth and the retention sections 112 of the framework 110. The upper artificial gingiva parts 130 may as well comprise surface structures on a bottom face arranged on the retention sections 112 for establishing non-destructive detachable direct connections with the retention structures 114 of the retention sections 112.

FIG. 5 finally shows a fully assembled assembly set providing a removable partial denture 101. Replacement teeth 102 are arranged in the through-holes 132 of the upper artificial gingiva parts 130 establishing non-destructive detachable direct connections between the replacement teeth 102 and the framework 110, more precisely the retention structures 114 of the retention sections 112. For this purpose, each of the replacement teeth 102 comprise a bottom face with a surface structure, e.g., comprising a plurality of protrusions 106. The surface structures are each configured to engage the complementary retention structure 114 provided by the retention sections 112 of the framework 110.

FIG. 6 shows a view of the removable partial denture 101 of FIG. 5 from below. The framework 110 is shown as well as the lower artificial gingiva parts 120 and the upper artificial gingiva parts 130. The lower artificial gingiva parts 120 are arranged beneath the retention sections 112 of the framework 110. The upper artificial gingiva parts 130 each may comprise lateral sections 134 laterally extending beyond the retention section 112 of the framework 110 on which the upper artificial gingiva parts 130 are configured to be arranged on. Each of the lower artificial gingiva parts 120 may comprise a bottom face 126 shaped to be placed on and match the surface of the natural gingiva of the patient. Furthermore, each of the lateral sections 134 may comprise a bottom face 136 shaped to be placed on and match the surface of the natural gingiva of the patient.

FIG. 7 shows the removable partial denture 101 of FIG. 6 with the lower artificial gingiva parts 120 removed. As shown in FIG. 7, the lower artificial gingiva parts 120 are arranged beneath the retention sections 112 of the framework 110 and configured to establish non-destructive detachable direct connections retention structures 114 provided by the retention sections 112.

FIG. 8 shows a view from beneath of the upper artificial gingiva parts 130 with through-holes 132, in which replacement teeth 102 are arranged. The replacement teeth 102 extend through the through-holes 132. The replacement teeth 102 may each comprise a bottom face with a surface structure 104, e.g., comprising a plurality of protrusions 106. The surface structures 104 are each configured to engage the complementary retention structure 114 provided by the retention sections 112 of the framework 110. By engaging the complementary retention structure 114 each surface structure 104 in combination with the respective complementary retention structure 114 provides a non-destructive detachable direct connection between one of the replacement teeth 102 and the framework 110, more precisely the retention section 112.

FIG. 9 finally shows a view from beneath of the replacement teeth 102 with the surface structures 104, e.g., comprising a plurality of protrusions 106, on their bottom faces.

FIG. 10 shows a schematic diagram of an exemplary computer system 10 for constructing an assembly set for a removable partial denture for a patient. Computer system 10 may be capable of performing any of the functionality set for constructing aforementioned embodiments of the assembly set. The computer system 10 may be operational with numerous other general purpose or special purpose computing system environments or configurations.

Computer system 10 may be described in the general context of computer system executable instructions, such as program modules comprising executable program instructions, being executable by the computer system 10. Generally, program modules may include routines, programs, objects, components, logic, data structures, and so on that perform particular tasks or implement particular abstract data types. Computer system 10 may be practiced in distributed computing environments where tasks are performed by remote processing devices that are linked through a communications network. In a distributed computing environment, program modules may be located in both local and remote computer system storage media including memory storage devices.

In FIG. 10, computer system 10 is shown in the form of a general-purpose computing device. The components of computer system 10 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 10 may comprise a variety of computer system readable storage media. Such media may be any available storage media accessible by computer system 10, and include both volatile and non-volatile storage media, removable and non-removable storage media.

A system memory 28 may include computer system readable storage media in the form of volatile memory, such as random access memory (RAM) 30 and/or cache memory 32. Computer system 10 may further include other removable/non-removable, volatile/non-volatile computer system storage media. For example, storage system 34 may be provided for reading from and writing to a non-removable, non-volatile magnetic media also referred to as a hard drive. For example, a magnetic disk drive for reading from and writing to a removable, non-volatile magnetic disk, e.g., a floppy disk, and an optical disk drive for reading from or writing to a removable, non-volatile optical disk such as a CD-ROM, DVD-ROM or other optical storage media may be provided. In such instances, each storage medium may be connected to bus 18 by one or more data media interfaces. Memory 28 may include at least one program product having a set of program modules, e.g., at least one program module, configured to carry out the constructing of the assembly set.

Program 40 may have a set of one or more program modules 42 and by way of example be stored in memory 28. The program modules 42 may comprise an operating system, one or more application programs, other program modules, and/or program data. Each of the operating system, one or more application programs, other program modules, and program data or some combination thereof, may include an implementation of a networking environment. One or more of the program modules 42 may carry out the constructing of the assembly set.

Computer system 10 may further communicate with one or more external devices 14 such as a keyboard, a pointing device, like a mouse, and a display 24 enabling a user to interact with computer system 10. Such communication can occur via Input/Output (I/O) interfaces 22. Computer system 10 may further communicate with one or more networks such as a local area network (LAN), a general wide area network (WAN), and/or a public network, like the Internet, via network adapter 20. Network adapter 20 may communicate with other components of computer system 10 via bus 18. It should be understood that although not shown, other hardware and/or software components could be used in conjunction with computer system 10.

The computer system 10 shown in FIG. 10 may be configured for constructing the assembly set for a removable partial denture. The computer system 10 may be a stand-alone computer with no network connectivity that may receive data to be processed, such as scanned data of a patient's mouth and/or digital models of components of the removable partial denture, like replacement teeth and an artificial gingiva through a local interface. Such operation may, however, likewise be performed using a computer system that is connected to a network such as a communications network and/or a computing network.

FIG. 11 shows an exemplary computer system 10 for constructing a digital model 103 of an assembly set for a removable partial denture for a patient. The computer system 10 may for example be configured as shown in FIG. 10. The computer system 10 may comprise a hardware component 54 comprising one or more processors as well as a memory storing machine-executable program instructions. Execution of the program instructions by the one or more processors may cause the one or more processor to control the computer system 10 to construct the digital model 103 of the assembly set. The computer system 10 may further comprise external devices, like a keyboard 58 and a mouse 56, enabling a user to interact with the computer system 10. Furthermore, the computer system 10 may comprise a display 24 providing a user interface 50 with control elements 52 enabling the user to control the construction of the digital model 103 of the assembly set using the computer system 10. The constructed the computer system 10 may be shown on the user interface 50.

FIG. 12 shows a production system 105 for constructing and producing an assembly set for a removable partial denture for a patient. The production system 105 may comprise the computer system 10 of FIG. 11. The computer system 10 may further be configured to control a 3D printer 60 for producing on or more component of the assembly set according to the digital model 103 constructed on the computer system 10. The 3D printer 60 may comprise a printing element 62 configured to print the components of the assembly set, like replacement teeth 102, layer by layer. In case the 3D printer 60 is capable of printing different materials, it may be used for printing multiple components of the assembly set, like replacement teeth 102, the framework, lower artificial gingiva parts and/or upper artificial gingiva parts. In case the 3D printer 60, e.g., is only capable to print a single material, a plurality of 3D printers 60 may be used to print the different components of the assembly set.

FIG. 13 shows a further production system 105 for constructing and producing an assembly set for a removable partial denture for a patient. The production system 105 may comprise the computer system 10 of FIG. 11. The computer system 10 may further be configured to control a machining device 70 configured to machining a blank 76 using one or more machining tools 72. The blank 76 of raw material 78 may be provided using a holding device 74 and cut into a desired final shape and size of the component to be produced, like a replacement tooth 102, using the one or more machining tools 72 for executing a controlled material-removal process. The machining tool 72 may for example be a milling tool. The machining device 70 may also be used to produce other components of the removable partial denture, like e.g. the framework. According to embodiments, the computer system 10 may be configured to control one or more 3D printer 60 in addition to one or more machining devices 70.

FIG. 14 shows a flowchart of an exemplary method for constructing an assembly set for a removable partial denture for a patient. In block 200, a digital model of one or more replacement teeth for the assembly set is provided. In block 202, a digital model of one or more artificial gingiva parts is provided. Each of the artificial gingiva parts may comprise a top face and a bottom face. Each of the bottom faces may be shaped to be placed on and match a surface of a natural gingiva of the patient. In block 204, each of the artificial gingiva parts is split in a lower artificial gingiva part comprising at least part of the bottom face of the respective artificial gingiva part and an upper artificial gingiva part comprising the top face of the respective artificial gingiva part. In block 206, a digital model of the framework with one or more retention sections is generated. The framework is configured to provide stability to the removable partial denture ensuring its structural integrity. The retention sections of the framework may comprise retention structures configured for providing non-destructive detachable direct connections at least to the replacement teeth and the lower artificial gingiva parts. For example, the retention structures may further be configured for providing non-destructive detachable direct connections to the upper artificial gingiva parts. In block 208, the digital model of the framework is subtracted from the digital model of the replacement teeth and from the digital model of the lower artificial gingiva part to generate a surface structure on a bottom face of each replacement teeth configured to engage one of the retention structures provided by one of the retention sections of the framework and to generate a further surface structure on a top face of each lower artificial gingiva part configured to engage one of the retention structures provided by one of the retention sections of the framework. In addition, the framework may also be subtracted from the upper artificial gingiva parts to generate surface structures on bottom faces of the upper artificial gingiva parts configured to engage the retention structures provided by the retention sections of the framework.

FIG. 15 shows a flowchart of an exemplary method for assembling an assembly set for a removable partial denture for a patient. The assembly set may comprise one or more replacement teeth, a framework with one or more retention sections as well as one or more upper artificial gingiva parts and one or more lower artificial gingiva parts. In block 300, the upper artificial gingiva parts are arranged on the retention sections. Each of the upper artificial gingiva parts may comprise one or more through-holes. In block 302, the replacement teeth are arranged in the through-holes. The replacement teeth extend through the through-holes of the upper artificial gingiva parts such that surface structures at bottom faces of the replacement teeth engage with complementary retention structures of the retention sections of the framework. The surface structures are configured to receive and retain the replacement teeth. Each of the surface structures of the replacement teeth in combination with the engaged complementary retention structure may form a non-destructive detachable direct connection between the respective replacement tooth and the respective retention section. In block 304, the lower artificial gingiva parts are arranged under one of the retention sections. Each of the lower artificial gingiva parts may comprise a top face and a bottom face. The bottom face may be shaped to be placed on and match a surface of the natural gingiva of the patient. The top face may comprise a further surface structure engaging a complementary retention structure provided by the retention section of the framework under which the respective lower artificial gingiva part is arranged. Each further surface structure in combination with the engaged complementary retention structure may provide a further non-destructive detachable direct connection between the lower artificial gingiva part and the retention section of the framework. According to alternative embodiments, block 304 may be executed before block 302 and/or block 300.

The assembled removable partial denture may further be checked for a suitable fit to the patient's mouth. If the fit is suitable, the removable partial denture may be dissembled and reassembled using an adhesive in order to make direct connection permanent. If the fit is insufficient, the removable partial denture may be dissembled, any insufficient component may be adjusted or replaced by a new component, and removable partial denture may be reassembled. The reassembled removable partial denture may be checked for a suitable fit to the patient's mouth.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

Possible advantageous embodiments may comprise the following combinations of features:

1. An assembly set for a removable partial denture for a patient, the assembly set comprising one or more replacement teeth as well as a framework with one or more retention sections,
   each of the retention sections being configured to receive and retain one or more of the replacement teeth,
   each of the replacement teeth comprising a bottom face with a first surface structure configured to engage an assigned complementary first retention structure provided by one of the retention sections of the framework configured to receive the respective replacement tooth,
   each first surface structure in combination with the assigned complementary first retention structure providing a first non-destructive detachable direct connection between the replacement tooth comprising the respective surface structure and the retention section comprising the respective assigned complementary retention structure.

2. The assembly set of item 1, one or more of the first surface structures each comprising one or more first protrusions protruding from the bottom face of the replacement tooth comprising the respective first surface structure,
   one or more of the first retention structure each comprising one or more first receptions for receiving the one or more first protrusions,
   each of the first protrusions being arranged at a position aligned with a respective position of one of the first receptions configured to receive the respective first protrusion in order to establish the first non-destructive detachable direct connection.

3. The assembly set of any of items 1 to 2, one or more of the first retention structures each comprising one or more first protrusions protruding from the retention section comprising the respective first retention structure,
   one or more of the first surface structures each comprising one or more first receptions for receiving the one or more first protrusions,
   each of the first protrusions being arranged at a position aligned with a respective position of one of the first receptions configured to receive the respective first protrusion in order to establish the first non-destructive detachable direct connection.

4. The assembly set of any of items 2 to 3, one or more of the aligned first receptions each being configured to provide, when the first non-destructive detachable direct connection is established, a remaining free space at a top of the aligned and received first protrusion for receiving an adhesive in order to provide an additional first permanent connection between the replacement teeth and the retention sections.

5. The assembly set of any of item 1 to 4, further comprising one or more upper artificial gingiva parts, each of the upper artificial gingiva parts being configured to be arranged on one of the retention sections and comprising one or more through-holes,
   each of the through-holes being configured to receive one of the replacement teeth in order for the surface structure of the bottom face of the respective replacement tooth to engage the assigned complementary retention structure of the respective retention section.

6. The assembly set of item 5, each of the upper artificial gingiva parts further comprising a bottom face with a second surface structure configured to engage an assigned complementary second retention structure provided by the retention section of the framework on which the respective upper artificial gingiva part is configured to be arranged on,
   each second surface structure in combination with the assigned complementary second retention structure providing a second non-destructive detachable direct connection between the upper artificial gingiva part comprising the respective second surface structure and the retention section comprising the respective assigned complementary second retention structure.

7. The assembly set of item 6, one or more of the second surface structures each comprising one or more second protrusions protruding from the bottom surface of the upper artificial gingiva part comprising the respective second surface structure,
   one or more of the second retention structures each comprising one or more second receptions for receiving the one or more second protrusions,
   each of the second protrusions being arranged at a position aligned with a respective position of one of the second receptions configured to receive the respective second protrusion in order to establish the second non-destructive detachable direct connection.

8. The assembly set of any of items 6 to 7, one or more of the second retention structures each comprising one or more second protrusions protruding from the retention section comprising the respective second retention structure,
   one or more of the second surface structures each comprising one or more second receptions for receiving the one or more second protrusions,
   each of the second protrusions being arranged at a position aligned with a respective position of one of the second receptions configured to receive the respective second protrusion in order to establish the second non-destructive detachable direct connection.

9. The assembly set of any of items 7 to 8, for each of the retention sections the one or more first retention structures of the respective retention section and the one or more second retention structure of the respective retention section being provided by a common retention structure configured to extend under the one or more replacement teeth to be carried by the respective retention section and under the one or more upper artificial gingiva parts to be arranged on the respective retention section.

10. The assembly set of any of items 7 to 8, for each of the retention sections the one or more first retention structures of the respective retention section and the one or more second retention structure of the respective retention section being provided by a common retention structure configured to extend under the one or more replacement teeth to be carried by the respective retention section and under the one or more upper artificial gingiva parts to be arranged on the respective retention section.

11. The assembly set of any of items 5 to 10, one or more of the upper artificial gingiva parts comprising one or more lateral sections laterally extending beyond the retention section of the framework on which the respective upper artificial gingiva part is configured to be arranged on,
- each of the lateral sections comprising a bottom face being shaped to be placed on and match a surface of a natural gingiva of the patient.

12. The assembly set of any of the previous items, further comprising one or more lower artificial gingiva parts, each of the lower artificial gingiva parts being configured to be arranged between one of the retention sections and the natural gingiva of the patient,
- each of the lower artificial gingiva parts comprising a top face and a bottom face,
- the bottom face being shaped to be placed on and match a surface of the natural gingiva of the patient,
- the top face comprising a third surface structure configured to engage an assigned complementary third retention structure provided by the retention section of the framework under which the respective lower artificial gingiva part being configured to be arranged,
- each third surface structure in combination with the assigned complementary third retention structure providing a third non-destructive detachable direct connection between the lower artificial gingiva part comprising the respective third surface structure and the retention section comprising the respective assigned complementary third retention structure.

13. The assembly set of item 12, one or more of the third surface structures each comprising one or more third protrusions protruding from the top face of the lower artificial gingiva part comprising the respective third surface structure,
- one or more of the third retention structures each comprising one or more third receptions for receiving the one or more third protrusions,
- each of the third protrusions being arranged at a position aligned with a respective position of one of the third receptions configured to receive the respective third protrusion in order to establish the third non-destructive detachable direct connection.

14. The assembly set of any of items 12 to 13, one or more of the third retention structures each comprising one or more third protrusions protruding from the retention section comprising the respective third retention structure,
- one or more of the third surface structures each comprising one or more third receptions for receiving the one or more third protrusions,
- each of the third protrusions being arranged at a position aligned with a respective position of one of the third receptions configured to receive the respective third protrusion in order to establish the third non-destructive detachable direct connection.

15. The assembly set of any of item 13 to 14, one or more of the aligned third receptions each being configured to provide, when the third non-destructive detachable direct connection is established, a remaining free space at a top of the aligned and received third protrusion for receiving an adhesive in order to provide an additional third permanent connection between the lower artificial gingiva parts and the retention sections.

16. The assembly set of any of items 12 to 15, for each of the retention sections the one or more first retention structures of the respective retention and the one or more third retention structures of the respective retention section being provided by the same retention structure configured to extend under the one or more replacement teeth to be received by the respective retention section and on the one or more lower artificial gingiva parts to be arranged under the respective retention section.

17. A removable partial denture for a patient, the partial denture comprising one or more replacement teeth, a framework with one or more retention sections as well as one or more upper artificial gingiva parts and one or more lower artificial gingiva parts,
- each of the retention sections being configured to receive and retain one or more of the replacement teeth,
- each of the upper artificial gingiva parts being arranged on one of the retention sections and comprising one or more through-holes,
- one of the replacement teeth being arranged in each of the through-holes,
- each of the replacement teeth comprising a bottom face with a first surface structure engaging an assigned complementary first retention structure provided by one of the retention sections of the framework configured to receive and retain the respective replacement tooth,
- each first surface structure in combination with the engaged complementary first retention structure forming a non-destructive detachable direct connection between the replacement tooth comprising the respective surface structure and the retention section comprising the respective engaged complementary retention structure,
- each of the lower artificial gingiva parts being configured to be arranged between one of the retention sections and the natural gingiva of the patient,
- each of the lower artificial gingiva parts comprising a top face and a bottom face,
- the bottom face being shaped to be placed on and match a surface of the natural gingiva of the patient,
- the top face comprising a further surface structure engaging an assigned complementary further retention structure provided by the retention section of the framework under which the respective lower artificial gingiva part being arranged,
- each further surface structure in combination with the engaged complementary further retention structure forming a further non-destructive detachable direct connection between the lower artificial gingiva part comprising the respective further surface structure and the retention section comprising the respective engaged complementary further retention structure.

18. A computer system for constructing an assembly set for a removable partial denture for a patient, the computer system comprising a processor and a memory storing machine-executable program instructions, execution of the program instructions by the processor causing the processor to control the computer system to:
- provide a digital model of one or more replacement teeth for the assembly set,
- provide a digital model of one or more artificial gingiva parts, each of the artificial gingiva parts comprising a top face and a bottom face, each of the bottom faces being shaped to be placed on and match a surface of a natural gingiva of the patient,
- split each of the one or more artificial gingiva parts in a lower artificial gingiva part comprising at least part of the bottom face of the respective artificial gingiva part and an upper artificial gingiva part comprising the top face of the respective artificial gingiva part, generate a digital model of the framework with one or more retention sections, the retention sections comprising retention structures configured for providing non-destructive detachable direct connections to at least the one or more replacement teeth and the lower artificial gingiva parts, subtract the digital model of the framework from the digital model of the one or more replacement teeth and from the digital model of the lower artificial gingiva part to generate a surface structure on a bottom face of each replacement teeth configured to engage one of the retention structures provided by one of the retention sections of the framework and to generate a further surface structure on a top face of each lower artificial gingiva part configured to engage one of the retention structures provided by one of the retention sections of the framework.

19. A computer program product comprising a non-volatile computer-readable storage medium having computer-readable program code embodied therewith for constructing an assembly set for a removable partial denture for a patient, the constructing comprising:

providing a digital model of one or more replacement teeth for the assembly set, providing a digital model of one or more artificial gingiva parts, each of the artificial gingiva parts comprising a top face and a bottom face, each of the bottom faces being shaped to be placed on and match a surface of a natural gingiva of the patient, splitting each of the one or more artificial gingiva parts in a lower artificial gingiva part comprising at least part of the bottom face of the respective artificial gingiva part and an upper artificial gingiva part comprising the top face of the respective artificial gingiva part, generating a digital model of the framework with one or more retention sections, the retention sections comprising retention structures configured for providing non-destructive detachable direct connections to at least the one or more replacement teeth and the lower artificial gingiva parts, subtracting the digital model of the framework from the digital model of the one or more replacement teeth and from the digital model of the lower artificial gingiva part to generate a surface structure on a bottom face of each replacement teeth configured to engage one of the retention structures provided by one of the retention sections of the framework and to generate a further surface structure on a top face of each lower artificial gingiva part configured to engage one of the retention structures provided by one of the retention sections of the framework.

20. A method for constructing an assembly set for a removable partial denture for a patient, the method comprising:

providing a digital model of one or more replacement teeth for the assembly set, providing a digital model of one or more artificial gingiva parts, each of the artificial gingiva parts comprising a top face and a bottom face, each of the bottom faces being shaped to be placed on and match a surface of a natural gingiva of the patient, splitting each of the one or more artificial gingiva parts in a lower artificial gingiva part comprising at least part of the bottom face of the respective artificial gingiva part and an upper artificial gingiva part comprising the top face of the respective artificial gingiva part, generating a digital model of the framework with one or more retention sections, the retention sections comprising retention structures configured for providing non-destructive detachable direct connections to at least the one or more replacement teeth and the lower artificial gingiva parts, subtracting the digital model of the framework from the digital model of the one or more replacement teeth and from the digital model of the lower artificial gingiva part to generate a surface structure on a bottom face of each replacement teeth configured to engage one of the retention structures provided by one of the retention sections of the framework and to generate a further surface structure on a top face of each lower artificial gingiva part configured to engage one of the retention structures provided by one of the retention sections of the framework.

21. A method for assembling an assembly set for a removable partial denture for a patient, the assembly set comprising one or more replacement teeth, a framework with one or more retention sections as well as one or more upper artificial gingiva parts and one or more lower artificial gingiva parts, the method comprising:

arranging each of the upper artificial gingiva parts on one of the retention sections, each of the upper artificial gingiva parts comprising one or more through-holes, arranging in each of the through-holes one of the replacement teeth with a surface structure at a bottom face of the respective replacement tooth engaging with an assigned complementary retention structure of one of the retention sections of the framework configured to receive and retain the respective replacement tooth, each surface structure in combination with the engaged complementary retention structure forming a non-destructive detachable direct connection between the replacement tooth comprising the respective surface structure and the retention section comprising the respective engaged complementary retention structure, arranging each of the lower artificial gingiva parts under one of the retention sections, each of the lower artificial gingiva parts comprising a top face and a bottom face, the bottom face being shaped to be placed on and match a surface of the natural gingiva of the patient, the top face comprising a further surface structure engaging an assigned complementary further retention structure provided by the retention section of the framework under which the respective lower artificial gingiva part being arranged, each further surface structure in combination with the engaged complementary further retention structure providing a further non-destructive detachable direct connection between the lower artificial gingiva part comprising the respective further surface structure and the retention section comprising the respective engaged complementary further retention structure.

LIST OF REFERENCE NUMERALS 10 computer system
14 external device
16 processing unit
18 bus
20 network adapter
22 I/O interface
24 display
28 memory 30 RAM
32 cache
34 storage system
40 program
42 program module
50 user interface
52 control elements
54 hardware device
56 external device
58 external device
60 3D printer
62 printing element
70 machining device
72 machining tool
74 holding device
76 blank
78 material
100 assembly set
101 removable partial denture
102 replacement tooth
103 digital model
104 surface structure
105 production system
106 protrusion
110 framework
112 retention section
114 retention structure
116 reception
120 lower artificial gingiva part
122 surface structure
124 protrusion
126 bottom face
130 upper artificial gingiva part
132 through-hole
134 lateral section
136 bottom face
140 digital denture model
142 natural gingiva

The invention claimed is:

1. An assembly set for a removable partial denture for a patient, the assembly set comprising:
one or more replacement teeth;
one or more artificial gingiva parts; and
a framework with one or more retention sections,
   each of the retention sections being configured to receive and retain one or more of the replacement teeth,
   each of the replacement teeth including a bottom face with a first surface structure configured to engage an assigned complementary first retention structure provided by one of the one or more retention sections of the framework configured to receive the respective replacement tooth, and
   each first surface structure in combination with the assigned complementary first retention structure providing a first non-destructive detachable connection between the respective replacement tooth and the respective retention section, the first non-destructive detachable connection being a reusable connection between the respective replacement tooth and the respective retention section,
the one or more retention sections of the framework configured to receive and retain the one or more artificial gingiva parts.

2. The assembly set of claim 1, wherein
the one or more first surface structures each include one or more first protrusions protruding from the bottom face,
the one or more assigned complementary first retention structures each include one or more first receptions for receiving the one or more first protrusions, and
each of the first protrusions is arranged at a position aligned with one of the first receptions, the one of the first receptions being configured to receive the aligned first protrusion to establish the first non-destructive detachable connection.

3. The assembly set of claim 2, wherein the one or more first receptions are each configured to provide, when the first non-destructive detachable connection is established, a remaining free space at a top of the aligned and received first protrusion for receiving an adhesive to provide an additional first permanent connection between the replacement teeth and the retention sections.

4. The assembly set of claim 1, wherein
the one or more assigned complementary first retention structures each include one or more first protrusions protruding from the respective retention section,
the one or more first surface structures each include one or more first receptions for receiving the one or more first protrusions, and
each of the one or more first protrusions is arranged at a position aligned with one of the first receptions, the one of the first receptions being configured to receive the aligned first protrusion to establish the first non-destructive detachable connection.

5. The assembly set of claim 1, wherein the one or more artificial gingiva parts include one or more upper artificial gingiva parts, each of the upper artificial gingiva parts being configured to be arranged on one of the retention sections and including one or more through-holes, each of the through-holes being configured to receive one of the replacement teeth in order for the first surface structure of the bottom face of the respective replacement tooth to engage the assigned complementary first retention structure of the respective retention section.

6. The assembly set of claim 5, wherein
each of the upper artificial gingiva parts further include a bottom surface with a second surface structure configured to engage an assigned complementary second retention structure, the assigned complementary second retention structure being provided by the retention section of the framework on which the respective upper artificial gingiva part is configured to be arranged on, and
each second surface structure in combination with the assigned complementary second retention structure provide a second non-destructive detachable connection between the respective upper artificial gingiva part and the respective retention section.

7. The assembly set of claim 6, wherein
the one or more second surface structures each include one or more second protrusions protruding from the bottom surface of the upper artificial gingiva part,
the one or more assigned complementary second retention structures each include one or more second receptions for receiving the one or more second protrusions, and
each of the second protrusions is arranged at a position aligned with one of the second receptions, the one of the second receptions being configured to receive the aligned second protrusion to establish the second non-destructive detachable connection.

8. The assembly set of claim 7, wherein the one or more aligned second receptions are each configured to provide, when the second non-destructive detachable connection is established, a remaining free space at a top of the aligned and received second protrusion for receiving an adhesive in order to provide an additional second permanent connection between the upper artificial gingiva parts and the respective retention sections.

9. The assembly set of claim 7, wherein (i) each of the retention sections, (ii) the one or more assigned complementary first retention structures of the respective retention section, and (iii) the one or more assigned complementary second retention structures of the respective retention section are provided by a common retention structure, the common retention structure being configured to extend under the one or more replacement teeth to be carried by the respective retention section and under the one or more upper artificial gingiva parts to be arranged on the respective retention section.

10. The assembly set of claim 6, wherein
the one or more assigned complementary second retention structures each include one or more second protrusions protruding from the retention section,
one or more of the second surface structures each include one or more second receptions for receiving the one or more second protrusions, and
each of the second protrusions is arranged at a position aligned with one of the second receptions configured to receive the aligned second protrusion to establish the second non-destructive detachable connection.

11. The assembly set of claim 5, wherein
the one or more upper artificial gingiva parts include one or more lateral sections laterally extending beyond the retention section of the framework on which the respective upper artificial gingiva part is configured to be arranged on, and
each of the lateral sections include a bottom face shaped to be placed on and match a surface of a natural gingiva of the patient.

12. The assembly set of claim 5, further comprising:
one or more lower artificial gingiva parts, each of the lower artificial gingiva parts being configured to be arranged between one of the retention sections and the natural gingiva of the patient,
each of the lower artificial gingiva parts including a top face and a bottom face, the bottom face being shaped to be placed on and match a surface of the natural gingiva of the patient, and the top face including a third surface structure configured to engage an assigned complementary third retention structure provided by the retention section of the framework, under which, the respective lower artificial gingiva part is configured to be arranged, and
each third surface structure in combination with the assigned complementary third retention structure providing a third non-destructive detachable connection between the lower artificial gingiva part and the retention section.

13. The assembly set of claim 12, wherein
the one or more third surface structures each include one or more third protrusions protruding from the top face of the lower artificial gingiva part,
one or more of the assigned complementary third retention structures each include one or more third receptions for receiving the one or more third protrusions, and
each of the third protrusions is arranged at a position aligned with one of the third receptions, the one of the third receptions being configured to receive the aligned third protrusion to establish the third non-destructive detachable connection.

14. The assembly set of claim 13, wherein the one or more of the aligned third receptions are each configured to provide, when the third non-destructive detachable connection is established, a remaining free space at a top of the aligned and received third protrusion for receiving an adhesive to provide an additional third permanent connection between the lower artificial gingiva parts and the retention sections.

15. The assembly set of claim 14, wherein (i) each of the retention sections, (ii) the one or more assigned complementary first retention structures of the respective retention section, and (iii) the one or more third retention structures of the respective retention section are provided by a common retention structure, the common retention structure being configured to extend under the one or more replacement teeth to be received by the respective retention section and on the one or more lower artificial gingiva parts to be arranged under the respective retention section.

16. The assembly set of claim 12, wherein
the one or more assigned complementary third retention structures each include one or more third protrusions protruding from the retention section,
one or more of the third surface structures each include one or more third receptions for receiving the one or more third protrusions, and
each of the third protrusions is arranged at a position aligned with one of the third receptions configured to receive the aligned third protrusion to establish the third non-destructive detachable connection.

17. A removable partial denture for a patient, the removable partial denture comprising:
one or more replacement teeth;
a framework with one or more retention sections;
one or more upper artificial gingiva parts; and
one or more lower artificial gingiva parts,
each of the retention sections being configured to receive and retain one or more of the replacement teeth,
each of the upper artificial gingiva parts being arranged on one of the retention sections and including one or more through-holes,
one of the replacement teeth being arranged in each of the through-holes,
each of the replacement teeth including a bottom face with a first surface structure engaging an assigned complementary first retention structure, the assigned complementary first retention structure being provided by one of the retention sections of the framework configured to receive and retain the respective replacement tooth,
each first surface structure in combination with the engaged complementary first retention structure forming a non-destructive detachable direct connection between the respective replacement tooth and the respective retention section,
each of the lower artificial gingiva parts being configured to be arranged between one of the retention sections and the natural gingiva of the patient,
each of the lower artificial gingiva parts including a top face and a bottom face, the bottom face being shaped to be placed on and match a surface of the natural gingiva of the patient, and the top face including a further surface structure engaging an assigned complementary further retention structure provided by the retention section of the framework, under which, the respective lower artificial gingiva part is arranged, and each further surface structure in combination with the engaged assigned complementary further retention structure forms a further non-destructive detachable direct connection between the lower artificial gingiva part comprising the respective further surface structure and the retention section comprising a respective engaged complementary further retention structure.

* * * * *